United States Patent
Grove et al.

(10) Patent No.: US 9,984,103 B2
(45) Date of Patent: *May 29, 2018

(54) ADAPTIVE FILTERING IN INDUSTRIAL CONTROL SYSTEM

(71) Applicant: Invensys Systems, Inc., Foxboro, MA (US)

(72) Inventors: Eric P. Grove, Dallastown, PA (US); Donald R. Tunnell, Jr., Perkiomenville, PA (US); Christopher Justin Miller, Emigsville, PA (US); William Yiu Leung Chan, Ontario (CA); Nicolas Pouyez, Paso Robles, CA (US)

(73) Assignee: Schneider Electric Software, LLC, Lake Forest, CA (US)

( * ) Notice: Subject to any disclaimer, the term of this patent is extended or adjusted under 35 U.S.C. 154(b) by 819 days.

This patent is subject to a terminal disclaimer.

(21) Appl. No.: 14/513,889

(22) Filed: Oct. 14, 2014

(65) Prior Publication Data

US 2015/0105885 A1    Apr. 16, 2015

Related U.S. Application Data

(60) Provisional application No. 61/890,800, filed on Oct. 14, 2013, provisional application No. 61/974,895, filed on Apr. 3, 2014.

(51) Int. Cl.
*G06F 19/00* (2018.01)
*G06F 17/30* (2006.01)
*G05B 19/418* (2006.01)

(52) U.S. Cl.
CPC . *G06F 17/30309* (2013.01); *G05B 19/41865* (2013.01); *G05B 2219/32097* (2013.01); *G05B 2219/32306* (2013.01); *Y02P 90/20* (2015.11)

(58) Field of Classification Search
None
See application file for complete search history.

(56) References Cited

U.S. PATENT DOCUMENTS 5,463,555 A * 10/1995 Ward ............... G06Q 10/06
                                                        700/100
6,141,647 A * 10/2000 Meijer ............. G06Q 10/087
                                                        700/100

(Continued)

OTHER PUBLICATIONS

Non-Final Rejection dated of Aug. 11, 2017 relevant to U.S. Appl. No. 14/513,898, 51 pgs.

(Continued)

*Primary Examiner* — Adam Lee
(74) *Attorney, Agent, or Firm* — Senniger Powers LLP

(57) ABSTRACT

An industrial control system stores three types of models. Models of a first type are associated with models of a second type. When a model of the first type is associated with a model of a third type, the set of models of the second type that are associated with the model of the first type is established. The industrial control system can provide an indication of the set of models of the second type. The industrial control system also establishes the set of models of the first type that are associated with the set of models of the second type. The industrial control system provides an indication of the set of models of the first type. In some embodiments, the industrial control system is a recipe management system and the models of the first, second, and third types are capability models, equipment models, and recipe models.

7 Claims, 31 Drawing Sheets

(56) References Cited

U.S. PATENT DOCUMENTS

| | | | | |
|---|---|---|---|---|
| 6,345,259 B1* | 2/2002 | Sandoval | G06Q 10/06 | 700/100 |
| 6,834,370 B1* | 12/2004 | Brandl | G05B 19/41865 | 715/201 |
| 7,092,988 B1* | 8/2006 | Bogatin | F24C 15/325 | 219/702 |
| 7,127,320 B1* | 10/2006 | Brown | G05B 19/418 | 700/121 |
| 7,747,958 B2* | 6/2010 | Luo | G06F 8/34 | 715/762 |
| 8,788,944 B1* | 7/2014 | Gill | G06F 8/61 | 715/744 |
| 9,055,120 B1* | 6/2015 | Firman | G06F 8/60 | |
| 2002/0055804 A1* | 5/2002 | Betawar | G05B 19/41865 | 700/117 |
| 2003/0163212 A1* | 8/2003 | Smith | G06Q 10/06 | 700/95 |
| 2003/0195779 A1* | 10/2003 | Scholl | G06Q 10/06 | 702/19 |
| 2003/0196186 A1* | 10/2003 | Scholl | G06Q 10/06 | 717/100 |
| 2005/0065626 A1* | 3/2005 | Kappelhoff | G06Q 20/203 | 700/97 |
| 2005/0228523 A1* | 10/2005 | Heminway | G05B 19/41865 | 700/100 |
| 2008/0034075 A1* | 2/2008 | Luinstra | G06Q 30/0603 | 709/223 |
| 2008/0288089 A1* | 11/2008 | Pettus | G05B 19/4184 | 700/9 |
| 2010/0082119 A1* | 4/2010 | Case | G05B 19/4188 | 700/28 |
| 2010/0217420 A1* | 8/2010 | Sinclair | G06Q 10/00 | 700/101 |
| 2011/0294399 A1* | 12/2011 | Molnar | B24B 37/042 | 451/5 |
| 2012/0246588 A1* | 9/2012 | Petersen | G06Q 30/02 | 715/769 |
| 2014/0128996 A1* | 5/2014 | Sayyarrodsari | G05B 17/02 | 700/29 |
| 2014/0330908 A1* | 11/2014 | Cartwright | G06Q 50/01 | 709/204 |

OTHER PUBLICATIONS

Non-Final Rejection dated Nov. Nov. 16, 2017 related to U.S. Appl. No. 14/513,815, 31pgs.

* cited by examiner

ADAPTIVE FILTERING IN INDUSTRIAL CONTROL SYSTEM

CROSS REFERENCE TO RELATED APPLICATIONS

This application claims the benefit of U.S. Provisional Application Ser. No. 61/974,895, filed on Apr. 3, 2014, the entire contents of which are hereby incorporated by reference. This application also claims the benefit of U.S. Provisional Application Ser. No. 61/890,800, filed on Oct. 14, 2013, the entire contents of which are hereby incorporated by reference.

FIELD OF THE DISCLOSURE

The present invention generally relates to the field of networked computerized systems used to provide supervisory process control instructions to a process plant. More particularly, the present invention relates a system providing recipe management functionality in a process control environment.

BACKGROUND OF THE DISCLOSURE

Manufacturing industries build products according to repeatable procedures that use standardized quantities of raw materials. In essence, products are manufactured according to recipes. A recipe may describe the quantity of raw materials used and the way the materials are combined to create the final product. In one simple example, a process control entity such as an industrial bakery may follow a basic recipe that lists all the ingredients and procedural steps needed to make cookies. In such an example, the recipe may define the amounts of particular ingredients, the quantity of time spent mixing the ingredients, and the time and temperature for baking. It should be understood that recipes may also be used to define other processes such as, for example, a sequence of on-off type operations of a single piece of equipment. For example, in the cookie making process discussed above, a recipe may be used to define the operations performed by the mixer alone. In such an example, the recipe may include a first mixing step where the mixer mixes a first group of ingredients for a first length of time and a second mixing step where the mixer mixes the first ingredients with a second group of ingredients for a second amount of time. Still other recipe types may also be used without departing from the scope of the present invention.

Products such as Wonderware's Recipe Manager Plus assist in creating and organizing recipes used to run various processes. As shown and discussed therein, prior recipe management systems relied on spreadsheet-based user interfaces in which users could define and create recipe templates. Although helpful for creating a set of instructions (recipe) for running a supervisory control routine, the grid-based recipe configuration systems are not very user-friendly.

In addition, conventional recipe management systems model pieces of equipment and recipes together so that a recipe model is tied to a piece of equipment. As a result, recipe models can only be used to run a recipe on one piece of equipment. In addition, multiple equipment models are required to run multiple recipes on the same piece of equipment.

SUMMARY

In one aspect, a recipe management system runs a recipe on a piece of equipment in a process plant comprising a plurality of pieces of equipment having a plurality of capabilities. The recipe management system is configured to receive user inputs. Based on the user inputs, the recipe management system is configured to create a capability model for each of the plurality of capabilities and create an equipment model for each of the pieces of equipment. The recipe management system is also configured to associate respective ones of the capability models with the equipment models based on the user inputs. Based on the user inputs the recipe management system is further configured to create a recipe model representing the recipe and associate at least one of the capability models with the recipe model based on the user inputs. The recipe management system is further configured to determine which of the equipment models are associated with said at least one of the capability models. In addition, the recipe management system is configured to provide an indication of the equipment models that are associated with said at least one of the capability models.

In another aspect, an industrial control system comprises an industrial control system database configured to store entity models of different types. The industrial control system includes a compatibility filtering system for determining the compatibility of models of one type with models of another type, the compatibility filtering system is configured to receive user inputs. In response to the user inputs, the compatibility filtering system is configured to create a plurality of entity models of a first type in response to the user inputs and create a plurality of entity models of a second type in response to the user inputs. In addition, the compatibility filtering system is configured to associate respective ones of the entity models of the first type with the entity models of the second type. The compatibility filtering system is also configured to create an entity model of a third type in response to user inputs. In response to the user inputs, the compatibility filtering system is configured to select at least one of the entity models of the first type for association with the entity model of the third type. Furthermore, the compatibility filtering system is configured to establish a set of compatible entity models of the second type by determining which of the entity models of the second type are associated with the selected at least one of the entity models of the first type. In addition, the compatibility filtering system is configured to establish a set of available entity models of the first type by determining which of the entity models of the first type are associated with the entity models in the set of compatible entity models of the second type. The compatibility filtering system is further configured to provide an indication of the entity models in the set of available entity models of the first type.

Other aspects and embodiments will be in part apparent and in part pointed out in the description and claims.

DETAILED DESCRIPTION

Figure 1:
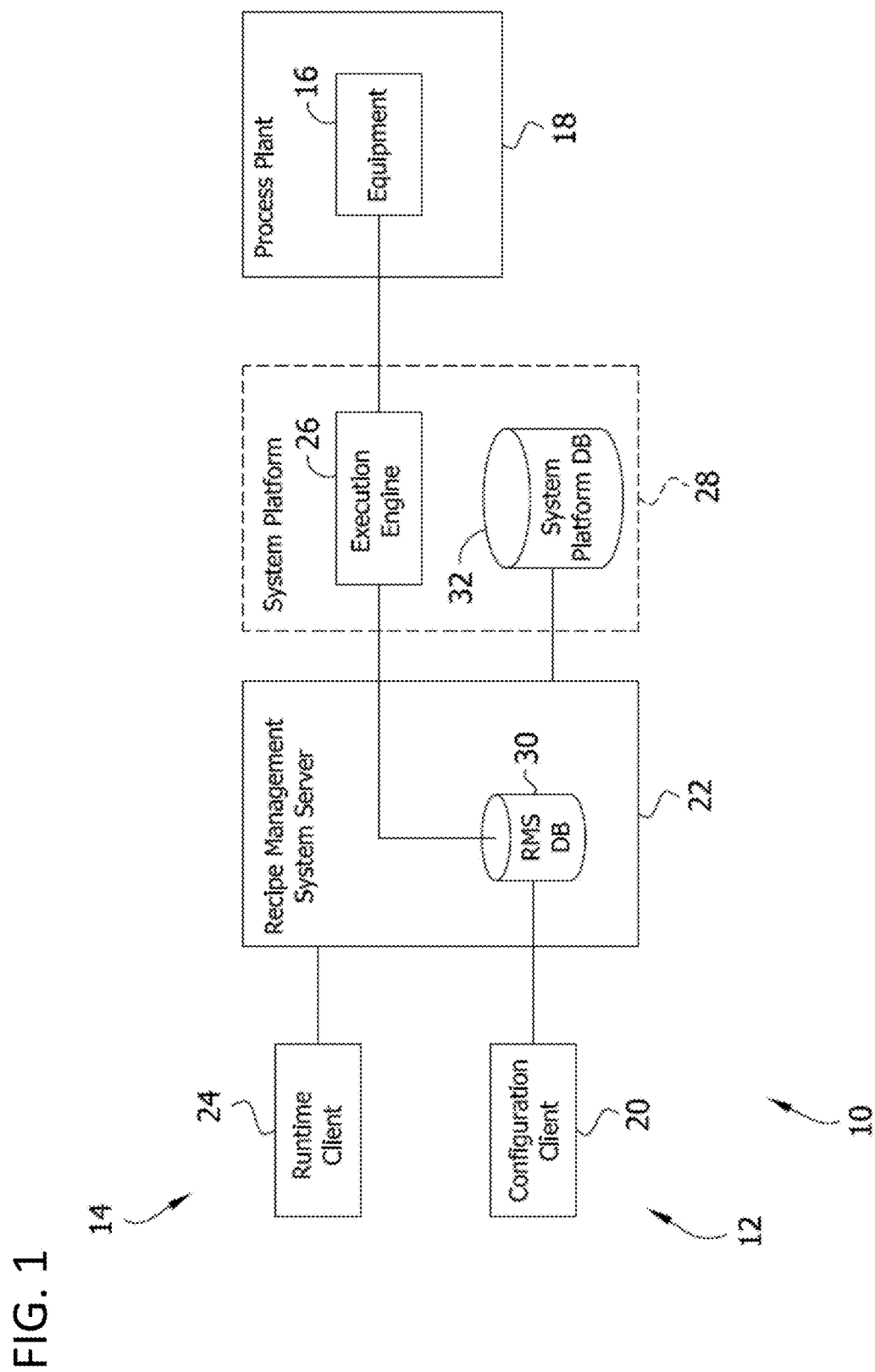
FIG. 1 is a block diagram of a recipe management system.

Referring to FIG. 1, a recipe management system is illustrated schematically and generally indicated at reference number 10. The recipe management system 10 includes a configuration system 12 and an execution system 14. The recipe management system 10 and, in the illustrated embodiment, the execution system 14 are configured to execute one or more recipes on equipment 16 in a process plant 18. Preferably, the equipment 16 includes several "pieces of equipment." Throughout the present disclosure and claims, it will be understood that a "piece of equipment" can include one or more apparatuses that perform a function in the process plant 18. Thus, a "piece of equipment" can, for example, include a single machine (e.g., an oven) that has one or more discrete capabilities (e.g., preheating, adding ingredients, baking, discharging, etc.) or a "piece of equipment" can include a connected sequence of machines (e.g., an assembly line) that each have their own capabilities that operate together to carry out one or more tasks. In some embodiments, the equipment 16 of the process plant 18 includes multiple pieces of equipment that perform the same tasks. Preferably, the pieces of equipment 16 in the process plant 18 have capabilities that can be used to carry out a recipe. For example, the equipment 16 can perform one or more operations according to its capabilities to transform an input (e.g., raw materials) into an output (e.g., processed materials). In a preferred process plant 18, each of the pieces of equipment 16 upon which the recipe management system 10 is capable of executing a recipe has local control (e.g., a local controller, a distributed control network, etc.). In such a process plant 18, the recipe management system 10 communicates with the local control for a piece of equipment 16 to execute a recipe thereupon.

In the illustrated embodiment, the recipe management system 10 executes one or more recipes on the equipment 16. A recipe can, for example, be executed by utilizing a single capability of a piece of equipment 16 according to defined parameters. In some embodiments, the recipe management system 10 is configured to execute a recipe that utilizes multiple capabilities of a piece of equipment 16 in a defined sequence, called a procedure. The procedure defines the sequence in which capabilities are utilized according to the recipe. The way each capability is used in a recipe is defined by capability parameters. The values for capability parameters are defined in a formula. A formula defines the parameter values for each capability of the piece of equipment 16 utilized in the procedure. Though recipes are described above as being defined by procedures and formulas, it should be understood that recipes can be defined in other ways without departing from the scope of the invention.

A recipe can be a member of a recipe class. A recipe class defines certain characteristics that are common among its member recipes. Thus, for example, a chocolate chip cookie making recipe can be a member of a cookie making recipe class. The cookie making recipe class might also include other members, such as, for example, a peanut butter cookie making recipe, an oatmeal raisin cookie making recipe, etc. A formula can be a member of a formula class. A formula class defines certain characteristics that can be common among its formula members. For example, a formula class can define the types of parameters used in its member formulas. Likewise, a formula class can define default values for its member formulas, which can be overridden in the member formulas as needed. A formula class can be an aspect of one or more recipe classes. Likewise, a procedure can be an aspect of one or more recipe classes (e.g., a recipe class with member recipes that are carried out by using certain capabilities in a defined sequence).

In the illustrated embodiment, the configuration system 12 includes a configuration client 20. The illustrated configuration client 20 is a web-based client that accesses web applications stored on a recipe management system server 22. As will be discussed in more detail below, using user interface tools of the configuration client 20, a user configures models used to execute recipes on the equipment 16 in the process plant 18. The configuration client 20 receives user inputs (e.g., to a web browser at a work station or other terminal) and communicates with the recipe management system server 22 to create and store models. The models are used by the execution system 14 to execute recipes on the equipment 16 in the process plant 18.

The execution system 14 includes a runtime client 24 and an execution engine 26, which includes logic and a code base for executing a recipe on a piece of equipment 16 based on one or more of the models stored in one of the databases 30, 32. The runtime client 24 is preferably a web-based client that receives user inputs through a web browser and communicates with the recipe management system server 22 to call execution of recipes using the models created and stored with the configuration system 12. The execution engine 26 communicates with one or more pieces of equipment 16 to execute recipes thereupon. In the illustrated recipe management system 10, the execution engine 26 is configured to be run as either a standalone executable or as an executable that is hosted by a system platform 28. If the recipe management system 10 is configured so that the execution engine 26 is a standalone executable, the configuration system 12 stores the models it creates in the recipe management system database 30. In the illustrated embodiment the recipe management system database 30 is shown local to the recipe management system server 22. It will be understood that in other embodiments the recipe management system database can reside remote from the recipe management system server 22 without departing from the scope of the invention. If the recipe management system 10 is configured so that the execution engine 26 is to be hosted in the system platform 28, the configuration system 12 stores the models it creates in a system platform database 32. Preferably, the execution engine 26 can run as a standalone executable hosted in a Microsoft Windows hosting environment. In a preferred embodiment, the system platform 28 is a Wonderware system platform. In the illustrated embodiment, the execution engine 26 uses the same logic and code base whether operating as a standalone executable or hosted by a system platform 28.

Figure 2:
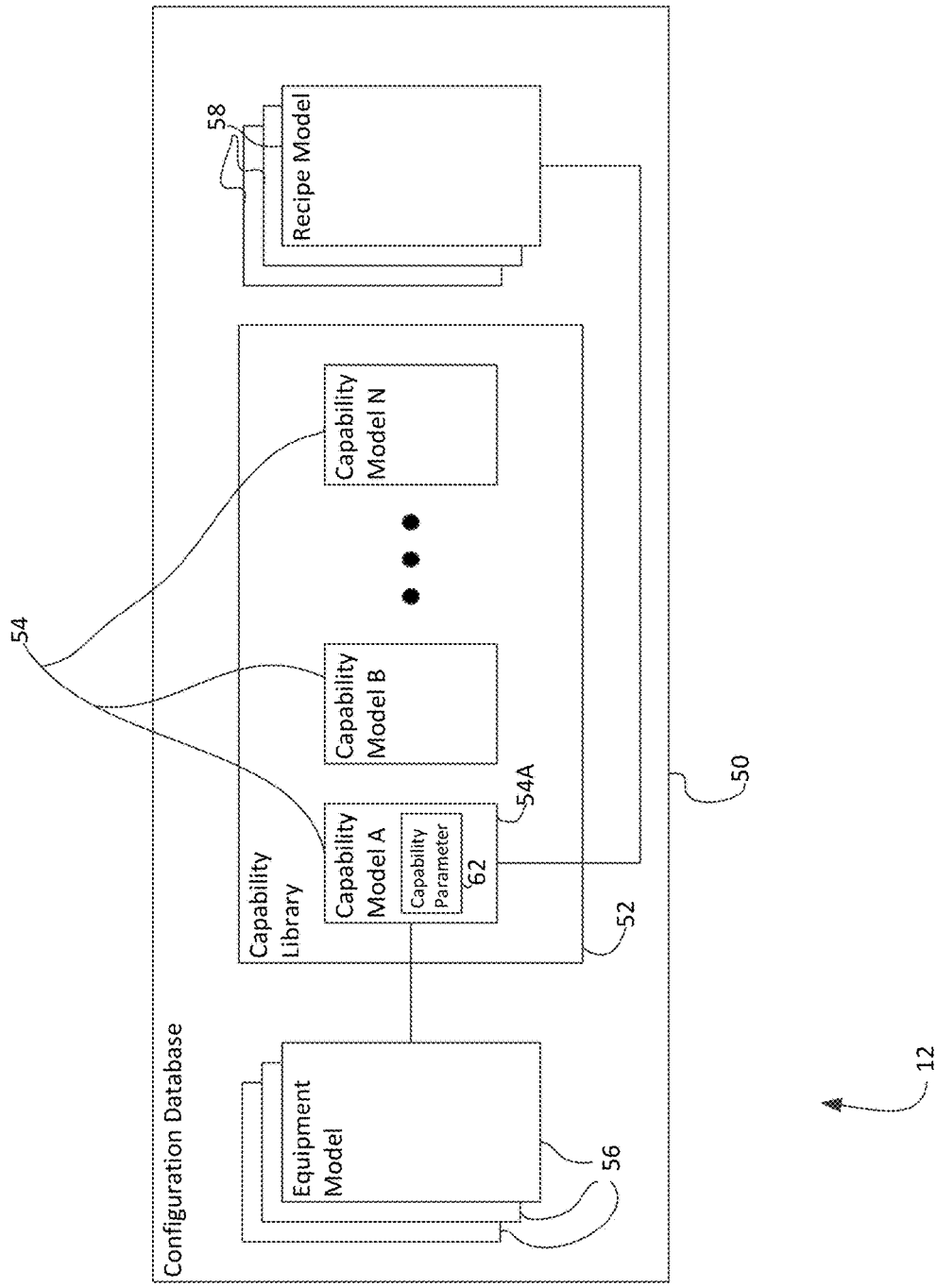
FIG. 2 is a block diagram of an embodiment of a configuration database.

As shown in FIG. 2, the recipe configuration subsystem 12 can include a configuration database 50. It will be understood that the configuration database 50 can be stored on the recipe management system database 30. If the recipe management system 10 is configured to execute a recipe using an execution engine that is hosted in the system platform 28, the system platform database 32 can also include a copy of the configuration database 50. In a preferred embodiment, the configuration database 50 is an SQL database. However, other types of configuration databases can also be used without departing from the scope of the invention. For example, it is contemplated that a recipe management system according to the present invention could use an object oriented database without departing from the scope of the invention. When the configuration database 50 is an SQL database, each of the models can include one or more records stored in the model. Associations between different types of models can be maintained through the use of foreign key identifiers or any other suitable type of reference.

Referring to FIGS. 1 and 2, the recipe management system 10 can be configured to run a recipe on a piece of equipment 16 that has at least one capability in a process plant that includes a plurality of pieces of equipment. Preferably, each of the pieces of equipment 16 in the process plant 18 has at least one capability. The recipe configuration system 12 is configured to create a capability library 52 and store the capability library on the configuration database 50. The illustrated capability library 52 stores the capability models 54 representing the capabilities of each of the pieces of equipment 16 in the process plant 18. Preferably, the configuration system 12 creates the capability models 54 in response to user inputs (e.g., user inputs defining certain characteristics of the capability models 54). By way of example, the configuration system 12 is configured to receive user inputs creating a capability model 54A representative of the at least one capability of the piece of equipment 16 upon which the recipe is to be run and create the model in response thereto. The configuration system 12 of the recipe management system 10 is also configured create an equipment model 56 representing each piece of equipment 16 upon which a recipe can be run in response to user inputs (e.g., user inputs defining certain characteristics of the equipment model 56). The configuration system 12 is also configured to create a recipe model 58 representing each recipe that can be executed on one of the pieces of equipment 16 in the process plant 18. As schematically illustrated in FIG. 2, the front-most equipment model 56 represents a piece of equipment 16 upon which the recipe represented by the front-most recipe model 58 can be executed. However, as illustrated, the configuration database 50 can store a plurality of equipment models 56 representing a plurality of pieces of equipment 16 in the process plant 18. Likewise, the configuration database 50 can store a plurality of recipe models 58 representing a plurality of recipes that can be executed using the capabilities of the pieces of equipment 16 in the process plant 18.

In response to user inputs selecting the capability model 54A from the capability library 52 for association with the equipment model 56, the recipe configuration system 12 is configured to associate the capability model 54A with the equipment model 56. Any suitable user inputs associating the capability model 54A with the equipment model 56 can be used without departing from the scope of the invention. Likewise, any suitable way of associating the capability model 54A with the equipment model 56 in the configuration database 50 can be used without departing from the scope of the invention. For example, the equipment model 56 can be assigned a reference to the capability model 54A (e.g., if the configuration database 50 is an SQL database, the equipment model 56 can include a foreign key identifier that references to the primary key identifier of a capability model 54). Likewise, a copy of the data contained in the associated capability model 54A can be made and stored along with the equipment model 56 (e.g., if the configuration database 50 is an SQL database, the capability model 54A or a portion thereof can be copied into one or more records that include a foreign key identifier that references to the primary key identifier of the equipment model 56). When a copy of the capability model 54A is made and associated with the equipment model 56, it preferably includes a reference that references the capability model 54A from which it was copied. In addition or in the alternative, the capability model 54A can be associated with the equipment model 56 through its association with other data in the configuration database 50 with which the equipment model 56 is also associated. Other ways of maintaining associations between equipment models 56 and capability models 54 are also permitted without departing from the scope of the invention.

In response to user inputs selecting the capability model 54A from the capability library 52 for association with the recipe model 58, the recipe configuration system 12 is configured to associate the capability model 54A with the recipe model. Any suitable user inputs associating the capability model 54A with the recipe model 58 can be used without departing from the scope of the invention. Likewise, any suitable way of associating the capability model 54A with the recipe model 58 in the configuration database 50 can be used without departing from the scope of the invention. For example, the recipe model 58 can be assigned a reference that references to the capability model 54A (e.g., if the configuration database 50 is an SQL database, the equipment model 56 can include a foreign key identifier that references to the primary key identifier of a capability model 54). Likewise, a copy of the data contained in the associated capability model 54A can be made and stored along with the recipe model 58 (e.g., if the configuration database 50 is an SQL database, the capability model 54A or a portion thereof can be copied into one or more records that include a foreign key identifier that references the primary key identifier of the recipe model 58). When a copy of the capability model 54A is made and associated with the recipe model 58, it preferably includes a reference to the capability model 54A from which it was copied. In addition or in the alternative, the capability model 54A can be associated with the recipe model 58 through its association with other data in the configuration database 50 with which the equipment model 56 is also associated. Other ways of maintaining associations between recipe models 58 and capability models 54 are also permitted without departing from the scope of the invention.

The configuration system 12 of the illustrated recipe management system 10 is configured to associate the same capability model 54A with both the equipment model 56 and the recipe model 58. In addition, to the extent multiple pieces of equipment 16 have the capability represented by the capability model 54A, the recipe management system 10 is configured to associate the same capability model 54A with each of multiple equipment models 56 representing the multiple pieces of equipment. Likewise, to the extent that multiple recipes are carried out using the capability represented by the capability model 54A, the recipe management system 10 is configured to associate the same capability model 54A with each of multiple recipe models 58. The execution system 14 of the recipe management system 10 is configured to use the equipment model 56, the recipe model 58, and their respective associations with the capability model 54A to run the recipe (represented by the recipe model 58) on the piece of equipment 16 that has the capability represented by the capability model 54A in the process plant 18. Preferably, the recipe management system 10 is configured to execute a recipe represented by a recipe model 58 on any piece of equipment 16 that is represented by an equipment model 56 associated with at least the same capability models 54 as the recipe model. The equipment model 56 can also be associated with additional capability models 54, so long as it is associated with at least the same capability models as the recipe model 58.

The illustrated recipe management system 10 is configured to assign a capability parameter 62 to the capability model 54A in response to user inputs. Though the illustrated capability model 54A is assigned one capability parameter 62, the syntax of the illustrated capabilities library 52 permits a capability model 54 to have zero-to-many capability parameters 62 assigned to it. Each capability parameter 62 assigned to a capability model 54 represents one type of parameter used to define how the recipe uses the capability (i.e., the capability represented by the capability model 54A) of the piece of equipment 16. A capability parameter 62 need not define the particular values for the type of parameter it represents because each recipe that uses the respective capability can have its own values for the parameter. Each capability parameter 62 can include information that, for example, names the parameter, defines a data type for the parameter (e.g., Boolean, string, etc.), assigns minimum and maximum values for the parameter, and defines the unit of measure for the parameter. Any suitable user inputs assigning the capability parameter 62 to the capability model 54A can be used without departing from the scope of the invention. Likewise, any suitable way of assigning the capability parameter 62 to the recipe model 58 in the configuration database 50 can be used without departing from the scope of the invention. For example, in certain embodiments, the capability parameter 62 includes a reference that references the capability model 54A (e.g., if the configuration database is an SQL database, a capability parameter 62 can include a foreign key identifier that references the primary key identifier of a capability model 54A). Likewise, the capability parameter 62 can be stored as a part of the capability model 54A. Other ways of assigning the capability parameter 62 to the capability model 54A are also permitted without departing from the scope of the invention Preferably, the configuration system 12 of the recipe management system 10 is configured to associate the equipment model 56 with the capability parameter 62 in response to user inputs. Any suitable user inputs can be used to associate the equipment model 56 with the capability parameter model 62. For example, the configuration system 12 can be configured to automatically associate the equipment model 56 with the capability parameter 62 in response to the user inputs associating the equipment model with the capability model 54A. Any suitable way of associating the equipment model 56 with the capability parameter 62 can be used without departing from the scope of the invention. For example, in certain embodiments, the equipment model 56 includes a reference that references the capability parameter 62 (e.g., if the configuration database is an SQL database, the equipment model 56 can include a foreign key identifier that references the primary key identifier of the capability parameter 62).

Figure 3:
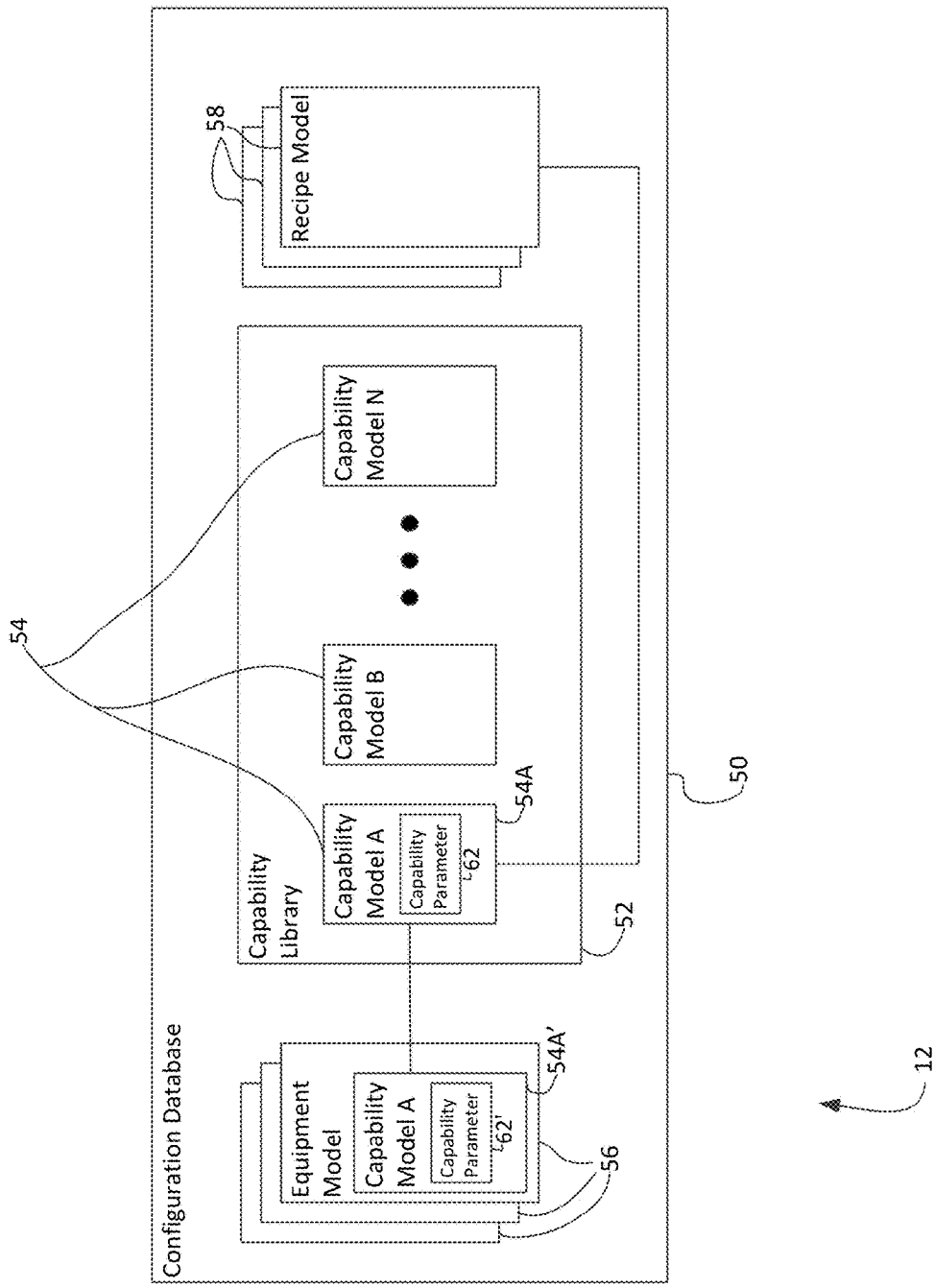
FIG. 3 is a block diagram of another embodiment of a configuration database.

Referring to FIG. 3, in a preferred embodiment of the recipe management system 10, the recipe configuration system 12 is configured to create a copy 54A' of the capability model 54 and associate the copy with the equipment model 56 in response to the user inputs selecting the capability model from the capability library 52 for association with the equipment. When user inputs associating the capability model 54A with the equipment model 56 are received, the configuration system 12 makes copies 54A', 62' of at least some of the data in the capability model 54A and its assigned capability parameter 62. The copied capability model 54A' receives a reference that references the equipment model 56 (e.g., if the configuration database is an SQL database, the copied capability model 54A' includes a foreign key identifier that references the primary key identifier of the equipment model 56), and the copied capability parameter 62' receives a reference that references the copied capability model 54A' (e.g., if the configuration database is an SQL database, the copied capability parameter 62' includes a foreign key identifier that references the primary key identifier of the copied capability model 54A'). The copied capability parameter 62' also preferably receives a reference that references the equipment model 56 (e.g., if the configuration database is an SQL database, the copied capability parameter 62' includes a foreign key identifier that references the primary key identifier of the equipment model 54A').

The capability parameter 62 defines default characteristics of the parameter. The copies 62' of the capability parameter 62 associated with an equipment model 56 define the characteristics of the parameter as they specifically relate to the piece of equipment 16 represented by the respective equipment model 56. In certain embodiments, the characteristics of the parameter vary depending on the piece of equipment 16. Preferably, the configuration system 12 of the recipe management system 10 is configured to override an aspect of the capability parameter 62 for the equipment model 56 in response to user inputs. Referring still to FIG. 3, the configuration system 12 is configured to write over data in the copied capability parameter 62' to define equipment-specific characteristics of the capability parameter for the equipment model 56 in response to user inputs. Thus, the copy 62' of the capability parameter 62 defines characteristics of the parameter that are specific to the piece of equipment 16 with which the equipment model 56 is associated.

Figure 4:
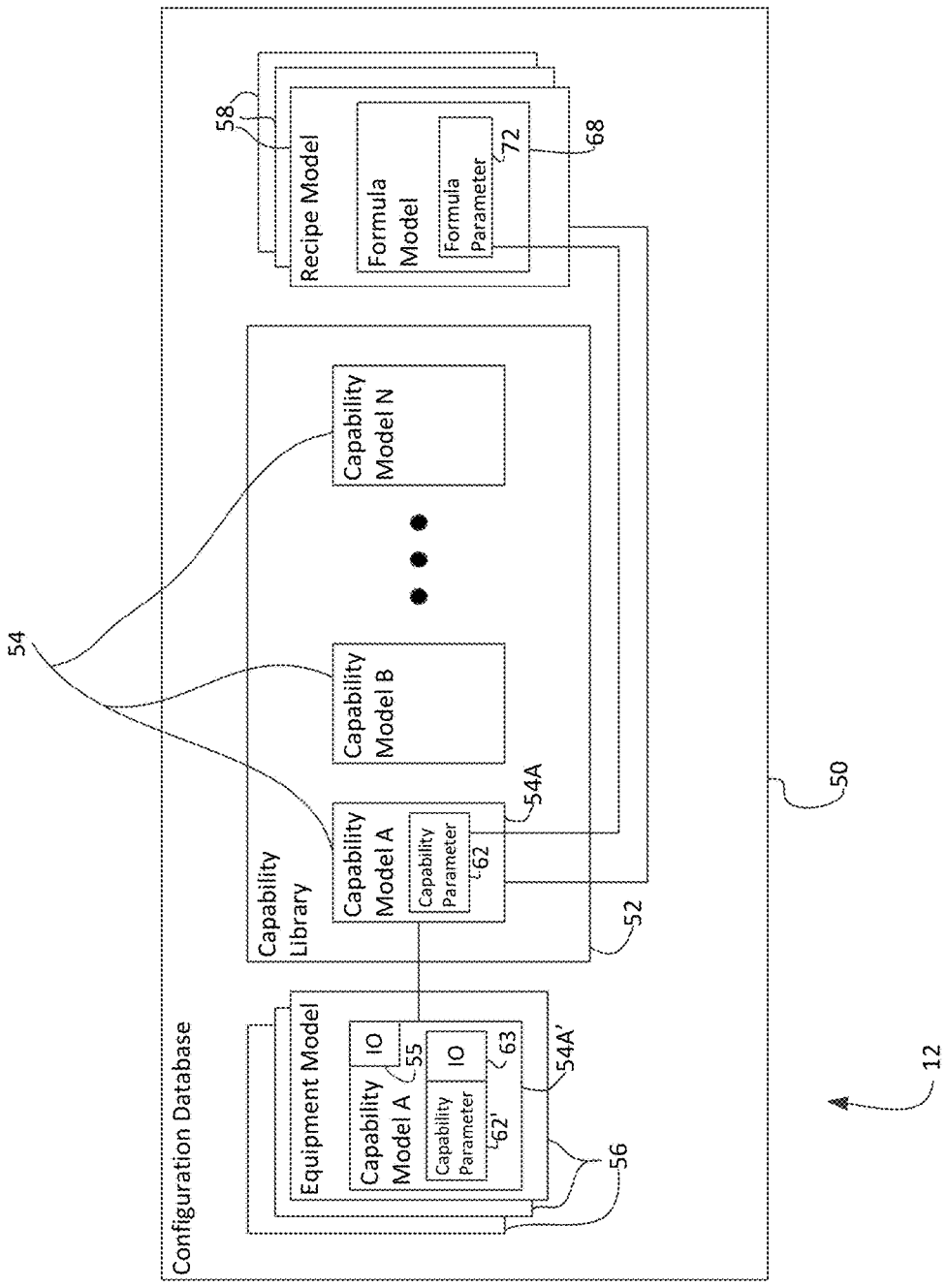
FIG. 4 is a block diagram of another embodiment of a configuration database.

Referring to FIG. 4, a formula model 68 representing a formula by which the recipe is carried out on the piece of equipment 16 in the process plant 18 is included in the recipe model 58. Preferably, the configuration system 12 of the recipe management system 10 is configured to include the formula model 68 in the recipe model 58 in response to user inputs. Any suitable user inputs can be used without departing from the scope of the invention. Within the configuration database 50, the formula model 68 can be included in the recipe model 58 in any suitable manner without departing from the scope of the invention. For example, the recipe model 58 can include a reference that references the formula model 68 (e.g., if the configuration database is an SQL database, the recipe model 58 includes a foreign key identifier that references the primary key identifier of the formula model 68). Likewise, the recipe model 58 can store the formula model 68 as part of its own data. Still other ways of including the formula model 68 in the recipe model 58 are permitted without departing from the scope of the invention.

The formula model 68 is assigned a formula parameter 72. The syntax of the configuration database 50 permits a formula model 68 to have zero-to-many formula parameters 72 assigned thereto. Each formula parameter 72 preferably includes data about a parameter used in a recipe that is executed on a piece of equipment 16 in the process plant 18. Certain formula parameters, such as the illustrated formula parameter 72, include data about a parameter used define how a recipe uses a capability of a piece of equipment 12. Other formula parameters (not shown) can include data about a parameter that relates to a piece of equipment 16 more generally (e.g., a parameter that relates to an aspect of a piece of equipment 16 that is not specific to one capability of the equipment). The formula parameter 72 can include data that defines a data type for a parameter (e.g., Boolean, string, etc.), assigns minimum and maximum values for the parameter, defines the unit of measure for the parameter, and defines a target value for the parameter. Any suitable user inputs assigning the formula parameter 72 to the formula model 68 can be used without departing from the scope of the invention. Within the configuration database 50, any suitable way of assigning the formula parameter 72 to the formula model 68 can be used without departing from the scope of the invention. For example, in certain embodiments, the formula parameter 72 includes a reference that references the formula model 68 (e.g., if the configuration database is an SQL database, a formula parameter 72 can include a foreign key identifier that references the primary key identifier of a formula model 68). Likewise, the formula parameter 72 can be stored as a part of the formula model 68. Other ways of assigning the formula parameter 72 to the formula model 68 are also permitted without departing from the scope of the invention.

As discussed above, the recipe model 58 is associated with the capability model 54A. Preferably, each capability parameter 62 assigned to a capability model 54 with which the recipe model 58 is associated has a formula parameter 72 in the formula model 68 of the recipe model. However, it will be understood that the formula model 68 can include additional formula parameters 72 (e.g., formula parameters that are associated with equipment parameters (not shown) that are not tied to any one capability of the piece of equipment 16). The configuration system 12 is configured to map between the capability model 54A and the formula parameter 72. Any suitable way to map between the capability model 54A and the formula parameter 72 can be used without departing from the scope of the invention. The configuration system 12 maps between each capability parameter 62 with which the recipe model 68 is associated and at least one formula parameter 72 (by way of the association between the recipe model 58 and the capability model 54A). Any suitable way of mapping between capability parameters 62 and formula parameters 72 can be used. For example, either or both of the formula parameter 72 or the capability parameter 62 can include a reference to the other (e.g., if the configuration database 50 is an SQL database, a foreign key identifier to the other's primary key identifier). Likewise, the mapping between the capability parameter 62 and formula parameter 72 might be derived through their respective associations with one or more additional records in the configuration database.

The configuration system 12 is configured to map a capability parameter 62 associated with the equipment model 56 with input/output (hereinafter "IO") addresses 63 of the piece of equipment 16 in response to user inputs. Any suitable way of mapping the capability parameter 62 to IO addresses 63 of the piece of equipment 16 can be used without departing from the scope of the invention. However, in the illustrated embodiment, the copy 62' of the capability parameter 62 is stored with one or more IO addresses 63 as part of the same record(s) in the configuration database 50. During execution of the recipe, the execution engine 26 reads and writes information about the respective parameter of the capability of the piece of equipment 16 to the IO addresses 63 stored with the copy 62' of the capability parameter 62.

The configuration system 12 is also configured to map a capability model 54A associated with the equipment model 56 with input/output (hereinafter "IO") addresses 55 of the piece of equipment 16 in response to user inputs. Any suitable way of mapping the capability model 54A to IO addresses 55 of the piece of equipment 16 can be used without departing from the scope of the invention. However, in the illustrated embodiment, the copy 54A' of the capability model 54A is stored with one or more IO addresses 55 as part of the same record(s) in the configuration database 50. During execution of the recipe, the execution engine 26 reads and writes information about the respective capability of the piece of equipment 16 to the IO addresses 55 stored with the copy 54A' of the capability model 54A.

The recipe management system 10 and, more specifically, the execution system 14 is configured to execute the recipe on the piece of equipment 16 by associating the recipe model 58 with the equipment model 56 and using the capability of the piece of equipment 16 represented by the capability model 54A and copy 54A'. Preferably, each formula parameter 72 in a recipe model 58 relates to a parameter associated with the equipment model 56 used to execute the recipe. For example, if as illustrated in FIG. 4 the equipment model 56 is associated with only one capability parameter 62 and no other capability parameters or equipment specific parameters, there formula model 68 preferably includes only formula parameters 72 that are related to the capability parameter 62. If the equipment model 56 representing the piece of equipment 16 upon which the recipe is to be executed includes additional parameters—either capability parameters 62 or equipment-specific parameters (not shown)—the formula model 68 can include formula parameters 72 that relate to any of the additional parameters of the equipment. However, just as a recipe model 58 need not be associated with each of the capability models 54 with which the equipment model 56 is associated to be used in executing a recipe on the represented piece of equipment, the formula model 68 need not include a formula parameter 72 for each of the parameters with which the equipment model 56 is associated. In the illustrated recipe management system 10, a piece of equipment 16 can be overqualified, with more capabilities and parameters than a recipe needs to execute on that piece of equipment.

Figure 5:
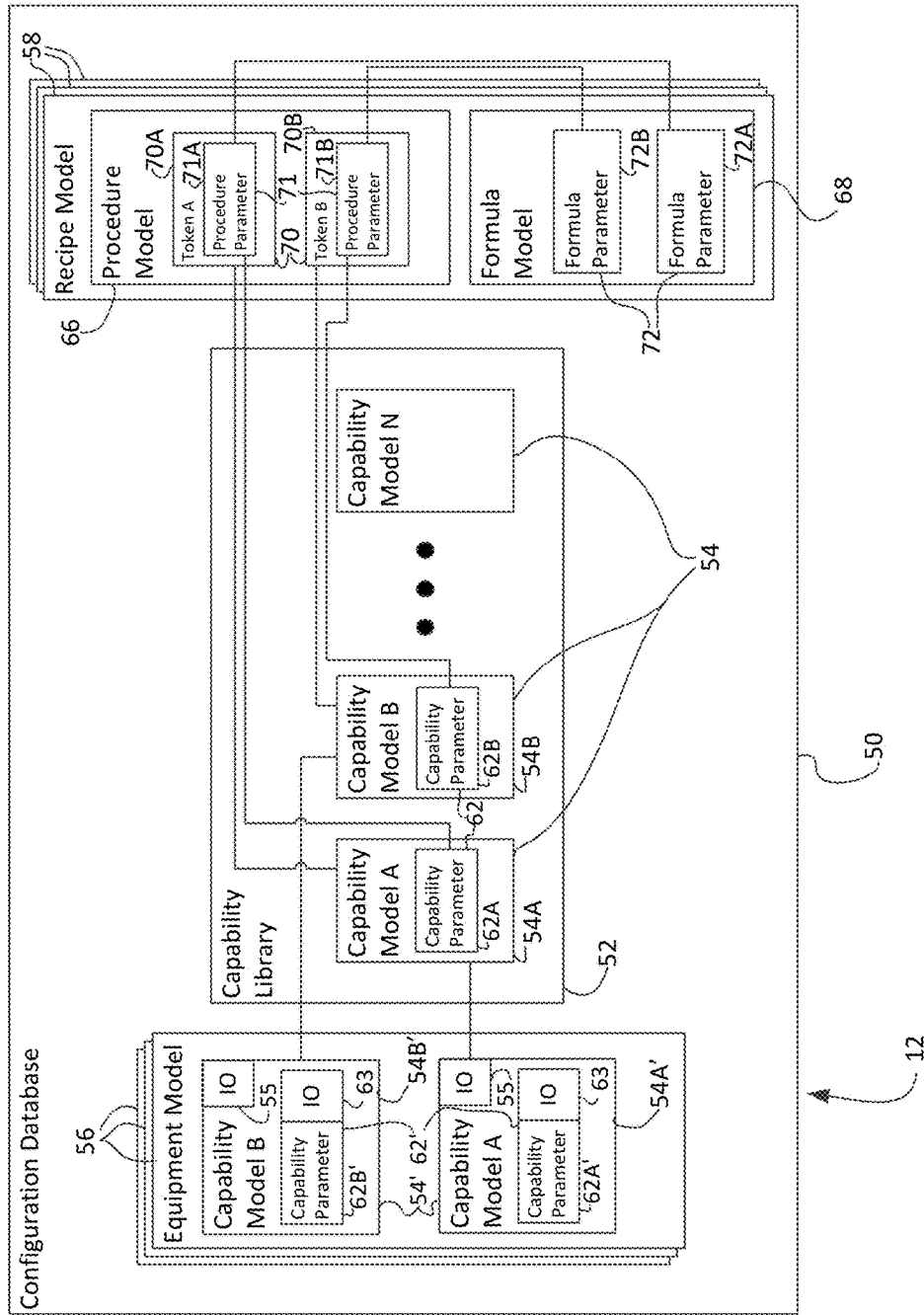
FIG. 5 is a block diagram of another embodiment of a configuration database.

Referring to FIG. 5, the equipment model 56 is configured to represent a piece of equipment 16 with two capabilities, and the recipe model 58 is configured to represent a recipe that uses the two capabilities of the piece of equipment. Though the illustrated example pertains to a recipe that uses two capabilities of the piece of equipment 16, it will be understood that the principles described in the example can be expanded to execute recipes that use more than two capabilities of a piece of equipment without departing from the scope of the invention. The recipe management system 10 is configured to associate the capability models 54A and 54B, which represent two of the capabilities of the piece of equipment 16, with the equipment model 56 in response to user inputs selecting the capability models from the capability library 52 for association with the equipment model. As above, any suitable way of associating the capability models 54A and 54B with the equipment model 56 is permitted without departing from the scope of the invention. Copies 54A', 54B' of at least some of the data contained in the capability models 54A and 54B are made and included in the equipment model 56. Each of the capability models 54A and 54B has a capability parameter 62A and 62B assigned to it. In the illustrated embodiment, each of the capability parameters 62A and 62B are also associated with the equipment model 56. Though the capability parameters 62A and 62B can be associated with the equipment model 56 and IO addresses 63 in any suitable manner copies 62A' and 62B' of at least some of the data contained in the capability parameters 62A and 62B are made, which are stored in records along with respective IO addresses and given references to respective copies 54A', 54B' of the capability models 54A, 54B and the equipment model 56.

The configuration system 12 of the recipe management system 10 is also configured to associate each of the two capability models 54A and 54B with the recipe model 58 in response to user inputs selecting the two capability models from the capability library 58 for association with the recipe model. In the illustrated embodiment, the recipe model 58 represents a sequence in which the two capabilities of the piece of equipment 16 represented by the capability models 54A and 54B are to be used when the recipe is executed. The recipe execution system 14 is configured to communicate with the configuration system 12 to execute the recipe by using the two capabilities of the piece of equipment 16 represented by the capability models 54A and 54B in the sequence defined in the recipe model 58.

The recipe model 58 includes a procedure model 66 associated with the capability models 54A and 54B to represent the sequence in which the capabilities of the piece of equipment 16 are used during execution of the recipe. The configuration system 12 creates the procedure model 66 in response to the user inputs selecting the capability models 54A and 54B from the capability library 58 for association with the recipe model 58. More specifically, the configuration system 12 creates the procedure model 66 in response to the user inputs arranging the capability models 54A and 54B in the sequence defined by the recipe model 58.

The procedure model 66 can be associated with the capability models 54A and 54B in any way that defines a sequence in which the capabilities of the piece of equipment 16 are used without departing from the scope of the invention. For example, in one embodiment the procedure model 66 includes at least one procedure token 70 for each capability model 54 with which the procedure model is associated. In the illustrated embodiment, each token 70A, 70B can include a reference that references the respective capability model 54A or 54B (e.g., in an SQL database, the token 70, 70B can include a foreign key identifier that references to the primary key identifier of a capability model 54A, 54B). In addition, each token 70 can include a parent identifier and a child identifier. The parent identifier for a token 70 provides an indication of the prior capability in a recipe sequence by reference to the token associated with the capability model 54 for the prior capability in the sequence. The child identifier for a token 70 provides an indication of the subsequent capability in the recipe sequence by reference to the token associated with the capability model 54 for the subsequent capability in the sequence. When the parent identifier for a token 70 is null, the capability model 54 with which the token is associated represents the first token in the sequence. When the child identifier for a token 70 is null the capability model 54 with which the token is associated represents the last token in the sequence.

The procedure model 66 is made up of the tokens 70A and 70B arranged in series. Other procedure models can also have tokens 70 arranged in parallel. The procedure model 66 represents a sequence in which two different capabilities of a piece of equipment 16 are used one time. In certain embodiments, one or more capabilities of a piece of equipment 16 can be used more than once in the sequence of a recipe. Thus, the procedure model 66 can include more than one token 70 that is associated with the same capability model 54. The use of the tokens 70 to associate capability models 54 with a procedure model 66 and arrange them in a sequence is but one way of defining a procedure model that represents the sequence in which the recipe management system 10 uses the capabilities of a piece of equipment 16 when carrying out a recipe. Other suitable ways can also be used without departing from the scope of the invention.

By way of the procedure model 66, the illustrated recipe model 58 is associated with capability models 54A, 54B that have capability parameters 62A, 62B. As discussed above, the illustrated recipe management system 10 maps a formula parameter 72 to each capability parameter 62 with which the recipe model 68 is associated. Thus, the configuration system 12 of the recipe management system 10 maps between each of the formula parameters 72A, 72B and a respective one of the capability parameters 62A, 62B. In a recipe model 58 that has a procedure model 66 that uses the same capability model 54A twice, the formula model 68 includes at least two formula parameters 72 that are each mapped to the capability parameter 62A of the capability model 54A, one for each of the instances of the capability model 54A in the procedure model 66. If a capability model 54 used in a procedure model 66 were to include n capability parameters 62, the formula model 68 would include at least n formula parameters 72, one for each of the n capability parameters in the capability model.

In the illustrated embodiment, the configuration system 12 maps between a formula parameter 72 and a respective capability parameter 62 using associations between the formula parameters and the procedure tokens 70 and the capability models 54 and the procedure tokens. More specifically, each of the procedure tokens 70A, 70B in the illustrated embodiment includes a procedure parameter 71A, 71B for each of the capability parameters 62A, 62B assigned to the capability model 54A, 54B with which it is associated. Preferably, the procedure parameters 71A, 71B include a copy of at least some of the data from their respective capability parameters 62A, 62B. In addition, the procedure parameters 71A, 71B can include a reference to the capability parameter 62A, 62B with which they are associated (for example, if the configuration database 50 is an SQL database, the procedure parameters 71A, 71B can include foreign key identifiers that reference the primary key identifiers of the capability parameters 62A, 62B with which they are associated). The procedure parameters 71A, 71B can each also include a reference to the token 70A, 70B with which it is associated (e.g., if the configuration database 50 is an SQL database, each of the procedure parameters 71A, 71B can include a foreign key identifier that references the primary key identifier of its respective procedure token 70A, 70B).

Preferably, in response to user inputs, the configuration system 12 creates an association between each of the formula parameters 72A, 72B and a respective one of the procedure parameters 71A, 71B. Any suitable user inputs can be used to cause the configuration system 12 to create an association between each of the formula parameters 72A, 72B and a respective one of the procedure parameters 71A, 71B without departing from the scope of the invention. Likewise, any suitable technique can be used to associate the formula parameters 72A, 72B with the respective procedure parameters 71A, 71B without departing from the scope of the invention. For example, in one embodiment each of the formula parameters 72A, 72B has a reference to one of the procedure parameters 71A, 71B of the procedure model 66. In another embodiment, a mapping model with references to each of a respective one of the formula parameters 72A, 72B and the procedure parameters 71A, 71B is used.

Figure 6:
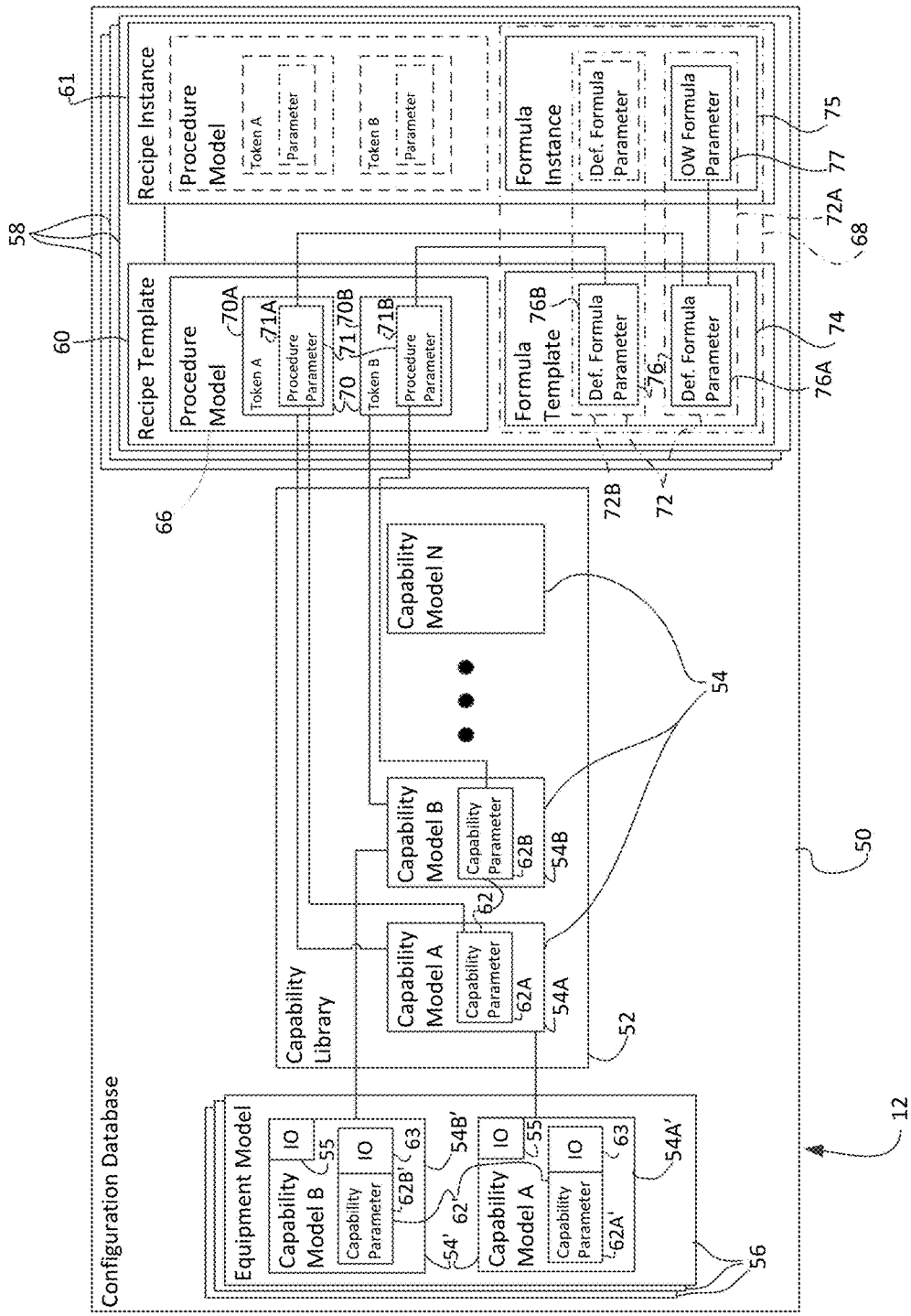
FIG. 6 is a block diagram of another embodiment of a configuration database.

Referring to FIG. 6, in the illustrated embodiment, each recipe model 58 includes a recipe template 60 and a recipe instance 61. The recipe template 60 represents a recipe class (e.g., features that are shared among members of a recipe class). The recipe instance 61 represents a specific member of the recipe class (e.g., features of one member of a recipe class). The recipe instances 61 are created from one or more recipe templates 60. More than one recipe instance 61 can be created from the same recipe template 60. In the illustrated recipe management system 10, each of the members of the recipe class uses capabilities of a piece of equipment 16 in the same sequence. Thus, a procedure model 66 is defined in the recipe template 60 and is used by each of the recipe models 58 created from the recipe template and its child recipe instances 61. No new procedure model is instantiated for a child recipe instance 61 in the illustrated embodiment.

The formula model 68 includes a formula template 74, which is associated with the recipe template 60, and a formula instance 75, which is associated with the recipe instance 61. The formula template 60 represents a formula class, and the formula instance 61 represents a member of the formula class. The formula template 74 can be associated with the recipe template 60 in any suitable way. Preferably, each formula template 74 includes default formula parameters 76. In the illustrated embodiment, the formula template 74 includes the default formula parameters 76A, 76B. Each of the members of the recipe class represented by the recipe template 60 has the same default formula values, which are defined in the default formula parameters 76A, 76B. However, as discussed in greater detail below, any of the default formula values can be overridden for any members of the formula class. As discussed above, the recipe management system 10 maps between the formula parameters 72 and related capability parameter 62. In the illustrated embodiment, the mapping between the formula parameters 72 and related capability parameters 62 is facilitated by mapping between the default formula parameters 76 that and related capability parameters 62. More specifically, the configuration system 12 of the recipe management system 10 is configured to associate the default formula parameters 76A, 76B with the procedure parameters 71A, 71B of the procedure model 66. The procedure parameters 71A, 71B are, likewise associated with the respective capability parameters 62A, 62B to map the default formula parameters 76A, 76B to the capability parameters 62A, 62B and thereby map the formula parameters 72A, 72B to the capability parameters 62A, 62B.

The formula parameters 72 are assumed to have the values defined in the default formula parameters 76. However, when a recipe instance 61 has instance-specific parameter values, overwrite formula parameters 77 are included in the formula instance 75. In the illustrated embodiment the formula instance 61 includes one overwrite formula parameter 77. Preferably, each overwrite formula parameter 77 is associated with the default formula parameter 76 whose default values it overrides. In the illustrated embodiment, the overwrite formula parameter 77 is associated with the default formula parameter 76A. The overwrite formula parameter 77 can be associated with the default formula parameter 76A in any suitable way. For example, the overwrite formula parameter 77 can include a reference to the default formula parameter 76A (e.g., if the configuration database 50 is an SQL database, the overwrite formula parameter 77 can include a foreign key reference to the primary key identifier of the default formula parameter 76A). The formula parameters 72 default to the values defined in their default formula parameters 76. However, when an overwrite formula parameter 77 is associated with a default formula parameter 76, the formula parameter 72 uses the values defined in the overwrite formula parameter. When an overwrite formula parameter 77 defines the parameter values for a formula parameter 72, the overwrite formula parameter is mapped to the related capability parameter 62. For example, the overwrite formula parameter 77 is mapped to the capability parameter 62A through the following associations: the overwrite parameter 77 is associated with the default formula parameter 76A; the default formula parameter 76A is associated with the procedure parameter 71A; and the procedure parameter 71A is associated with the capability parameter 62A.

In each of the above-described embodiments, the capability models 54A-54N have only one capability parameter 62. However, the recipe management system 10 described above is scalable so that the configuration database 50 can store capability models 54A-54N of the pieces of equipment 16 that are defined by more than one capability parameter 62. In addition, though each of the embodiments of the configuration database 50 described above illustrate a single equipment model 56, it is understood that the recipe management system 10 can be configured to store equipment models 56 for each of a plurality of pieces of equipment 16 in a process plant 18.

In one embodiment the process plant 18 includes first, second, and third (and potentially other) pieces of equipment 16. The first and second pieces of equipment 16 each have first and second capabilities, but the third piece of equipment has different capabilities. The recipe management system 10 is configured to create first, second, and third equipment models 56 representing the first, second, and third pieces of equipment 16 in response to user inputs. In response to user inputs, the recipe configuration system 12 is also configured to create first and second capability models 54 representing the first and second capabilities possessed by each of the first and second pieces of equipment 16. In addition, the recipe configuration system 12 is configured to create different capability models 54 representing the different capabilities of the third piece of equipment 16. The first and second capability models 54 are stored in the capability library 52. The recipe configuration system 12 is configured to assign capability parameters 62 to the capability models 54 stored in the capability library 52. In response to user inputs selecting the first and second capability models 54 from the capability library 52 for association with the first and second pieces of equipment 16, the configuration system 12 is configured to associate the first and second capability models 54 representing the first and second capabilities with each of the first and second equipment models 56. In response to user inputs selecting the other capability models 54 from the capability library 52 for association with the third piece of equipment 16, the configuration system 12 is configured to associate the other capability models 54 representing the different capabilities with the third equipment model 56. In response to user inputs selecting the first and second capability models 54 from the capability library 52 for association with a recipe model 58 representing a recipe that is executable on either of the first and second pieces of equipment 16, the configuration system 12 is configured to associate the first and second capability models 54 with the recipe model 58.

The recipe execution system 14 of the recipe management system 10 is in communication with the first, second, and third pieces of equipment 16 in the process plant. The execution system 14 is configured to execute the recipe that can be executed on either of the first and second pieces of equipment 16 on a selected one of the first and second pieces of equipment in response to user inputs selecting one of the first and second pieces of equipment. The recipe execution system 14 is further configured to provide an indication that the recipe for executing on either of the first and second pieces of equipment 16 cannot be executed on the third piece of equipment.

As discussed above, the execution system 14 of the recipe management system 10 is configured to execute the recipe on the piece of equipment 16 by associating the recipe model 58 with the equipment model 56 based on the associations between those models and the capability models 54. However, prior to receiving user inputs requesting execution of the recipe on the piece of equipment 16, the recipe model 58 is not directly associated with the equipment model 54. As a result, the recipe execution subsystem is capable of at least one of (a) executing a recipe other than the one represented by the recipe model 58 on the piece of equipment represented by the equipment model 56 or (b) executing the recipe represented by the recipe model 58 on a different piece of equipment than the one represented by the equipment model 56.

Figure 7:
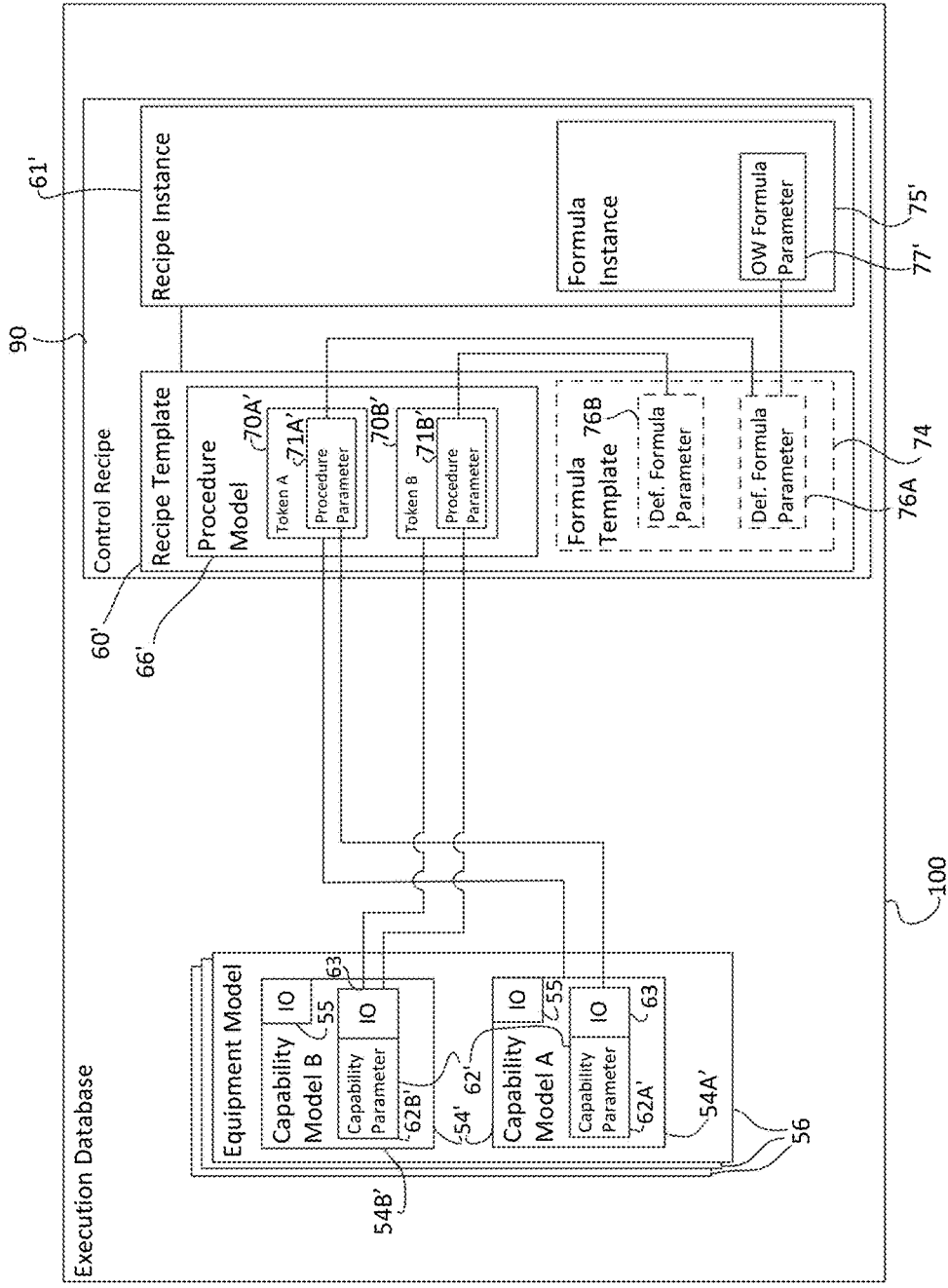
FIG. 7 is a block diagram of an execution database.

Referring to FIG. 7, an execution database 100 of the execution system 14 of the recipe management system 10 includes the equipment models 56 configured and stored in the configuration database 50 and a control recipe model 90. In the illustrated embodiment, the equipment models 56 are part of both the configuration database 50 and the execution database 100. As discussed above, the execution system 14 of the recipe management system 10 is configured to execute the recipe on the piece of equipment 16 by associating the recipe model 58 with the equipment model 56 and using the capabilities of the piece of equipment represented by the capability models 54 associated with the recipe model and equipment model. In the illustrated embodiment, the execution system 14 is configured to create the control recipe model 90, which is a copy of the relevant data from the recipe model 58, and map the control recipe model directly to the equipment model 56 in the execution database 100.

The execution system 14 of the recipe management system 10 is preferably configured to create the control recipe model 90 in response to user inputs selecting the recipe represented by the recipe model 58 for execution on the piece of equipment 16 represented by the equipment model 56. In the illustrated embodiment, the control recipe model 90 includes a copy of the recipe template 60', including a copy of the procedure model 66'. The control recipe model 90 also includes copies of the procedure tokens 70A', 70B', the procedure parameters 71A', 71B', and the default formula parameters 76A', 76B'. In addition, the control recipe model 90 includes a copy of some of the data from the recipe instance 61', including a copy of the formula instance 75'. As discussed in greater detail below, the runtime client 24 is preferably configured to receive user inputs editing formula parameters at runtime. If user inputs editing formula parameters at runtime are received, the changes are stored in an overwrite formula parameter 77' in the copy of the formula instance 75' of the control recipe 90. It is contemplated that in other embodiments a control recipe can include different copied data from a recipe model 58 without departing from the scope of the invention. In the illustrated embodiment, the control recipe 90 does not include a copy of the formula template 74. Instead, the execution system 14 is configured to query the configuration database 50 for the information contained in the formula template 74 when used during recipe execution. It is contemplated that, in other embodiments, a control recipe can include a copied formula template 74 without departing from the scope of the invention. Preferably, the control recipe 90 maps the copies of the procedure parameters 71A', 71B' to the default formula parameters 76A, 7B in the configuration database 50. Likewise, the control recipe maps the copy of the procedure parameter 71A' to the copy of the overwrite formula 77. Any suitable way of maintaining the mappings in the control recipe 90 can be used without departing from the scope of the invention.

As discussed above, the procedure model 66 represents the sequence in which the recipe uses capabilities of a piece of equipment 16 during execution. Based on the mapping of the procedure tokens 70A, 70B to the capability models 54A, 54B in the configuration database 50, the execution system 14 is configured to map the copies of the procedure tokens 70A', 70B' in the control recipe model 90 to the copies of the capability models 54A', 54B' in the execution database 100. Any suitable way of mapping the copies of the procedure tokens 70A', 70B' to the copies of the capability models 54A', 54B' can be used without departing from the scope of the invention. For example, capability map models can be used to map the copies of the procedure tokens 70A', 70B' to the copies of the capability models 54A', 54B'. More specifically, the capability map models can include a first reference to a respective one of the copies of the capability models 54A', 54B' and a second reference to a respective one of the copies of the procedure tokens 70A', 70B'. In addition, as discussed above, each of the copies of the capability models 54A', 54B' is associated with 10 references 55. Through the mapping between the copies of the procedure tokens 70A', 70B' and the copies of the capability models 54A', 54B' and the association between the copies of the capability models 54A', 54B' and the IO addresses 55, the execution system 14 is configured to map the procedure model 66' to the appropriate IO addresses of the piece of equipment. Based on this information the execution engine 26 can provide supervisory control instructions to the piece of equipment 16 that direct the piece of equipment to carry out a recipe using the capabilities of the piece of equipment in the sequence defined in the procedure model 66'.

The formula model 68 represents the parameter values used in the recipe represented by the recipe model 58. For each capability parameter 62A', 62B' used in a recipe, the execution system is configured to determine whether to use a default formula parameter 76A, 76B or an overwrite formula parameter 77' (e.g., based on whether an overwrite formula parameter is associated with the default formula parameter). Using the mapping in the configuration database 50 between the copies of the capability parameters 62A, 62B' and the capability parameters 62A, 62B and the mapping between the procedure parameter 71A, 71B and the capability parameters 26A, 62B, the execution system 14 is configured to map the copies of the procedure parameters 71A', 71B' to the copies of the capability parameter 62A', 62B' in the execution database 100. Any suitable way of mapping the copies of the procedure parameters 71A', 71B' to the copies of the capability parameters 62A', 62B' can be used without departing from the scope of the invention. For example, parameter map models can be used to map the copies of the procedure parameters 71A', 71B' to the copies of the capability parameters 62A', 62B'. More specifically, the parameter map models can include a first reference to a respective one of the copies of the capability parameters 62A', 62B' and a second reference to a respective one of the copies of the procedure parameters 71A', 71B'. As discussed above, the execution system 14 is configured to query the configuration database 12 for data contained in the default formula parameters 76A, 76B to thereby map the default formula parameters to the copies of the procedure parameters 71A', 71B'. In addition, the execution system 14 maintains a mapping between the copy of the procedure parameter 71A' and the overwrite formula parameter 77'. Furthermore, copies of the capability parameters 62A', 62B' are associated with IO addresses 63. By using the association between the copy of overwrite formula parameter 77' and the procedure parameter 71A', the associations between the default formula parameters 76A, 76B and the copies of the procedure parameters 71A', 71B', the mapping between the copies of the capability parameters 62A', 62B, and the copies of the procedure parameters, and the association between the copies of the capability parameters and their IO addresses 63, the execution system is configured to write formula parameter values to IO addresses of the piece of equipment 16 and execute the recipe on it.

Figure 8:
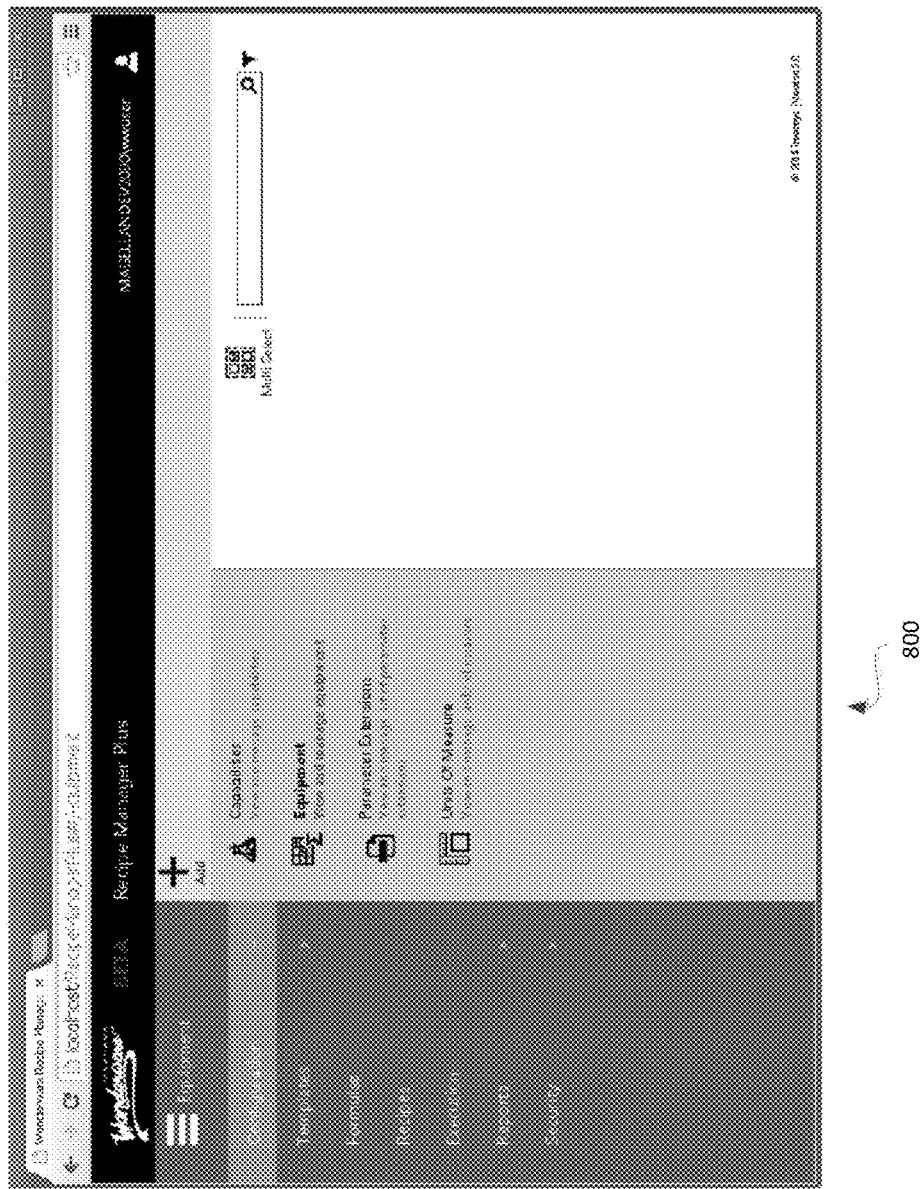
FIG. 8 is a screenshot of a root menu view.

Referring to FIGS. 8-25, an exemplary user interface for the recipe management system 10 is illustrated. The user interface provides a series of views to facilitate receiving the necessary user inputs to build and associate the models on the configuration database 50 and execution database 100 as described above. As shown in FIG. 8, from a root menu view 800, a user can select from selection objects for configuring capability models 54, equipment models 56, templates (e.g., formula templates 74 or recipe templates 60), and formula models 68. In addition, the user can select a selection object (labeled 'Execution') to navigate to a control panel for controlling execution of a recipe on a piece of equipment 16.

Figure 9:
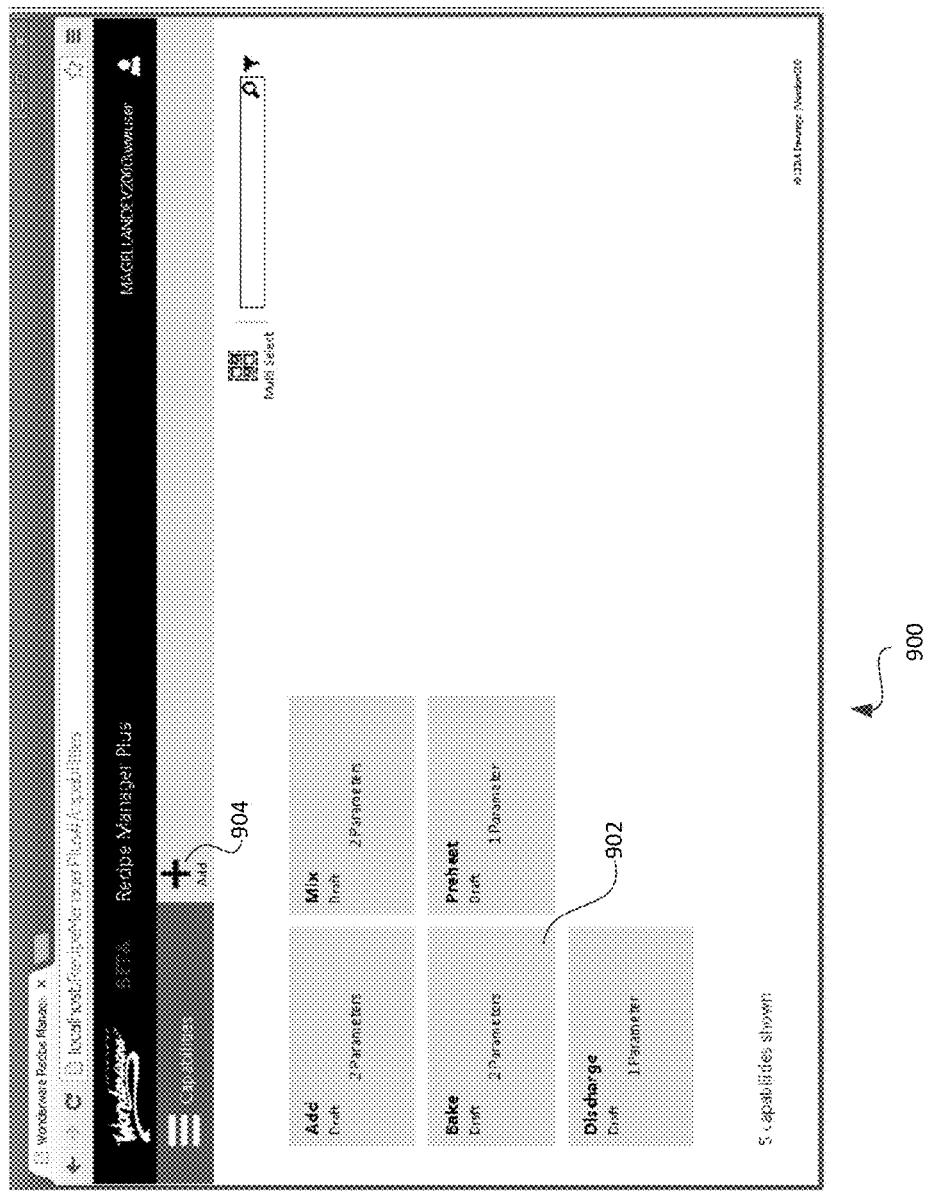
FIG. 9 is a screenshot of a capabilities tiles view.
Figure 10:
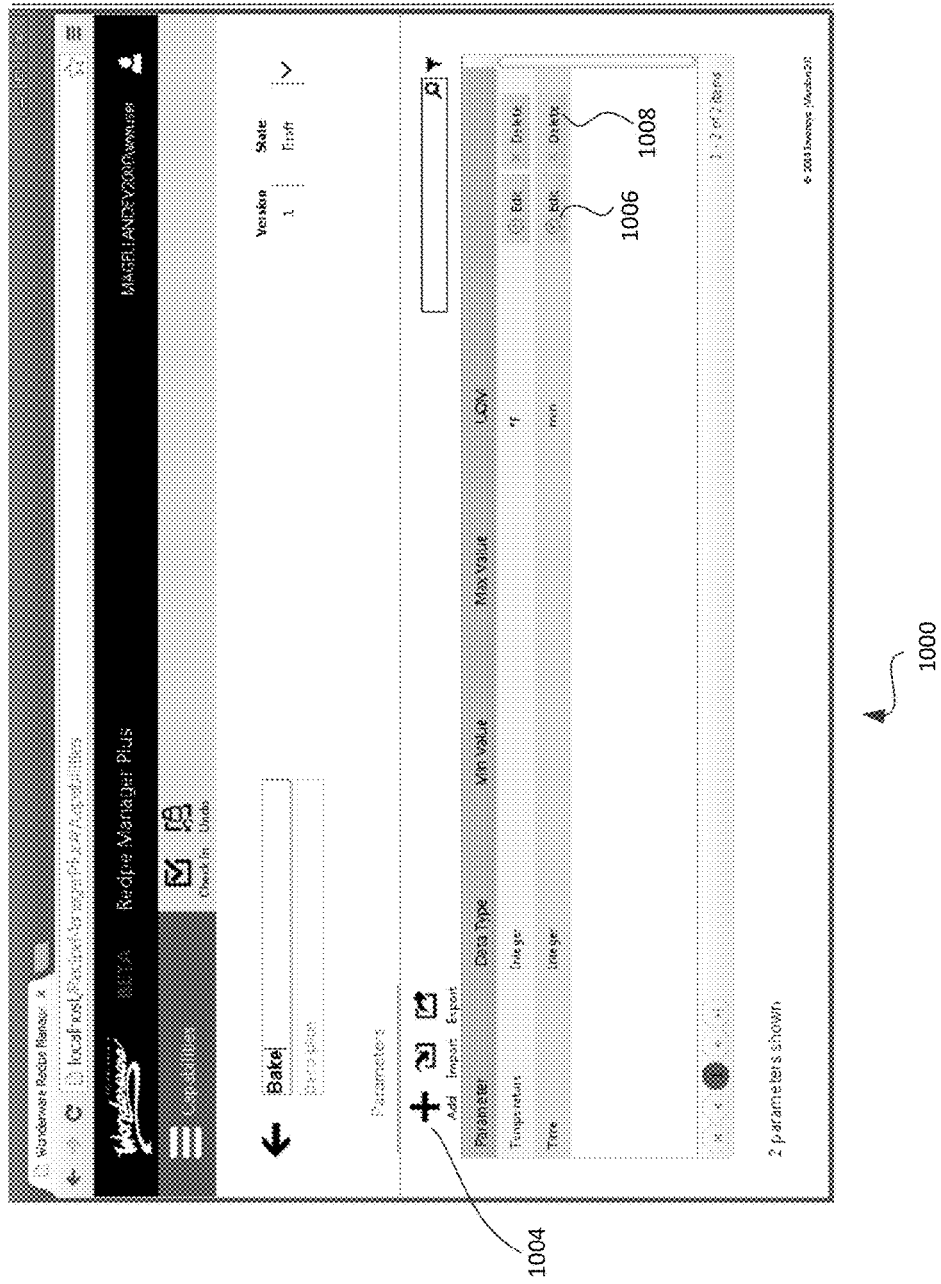
FIG. 10 is a screenshot of a capabilities detail view.
Figure 10A:
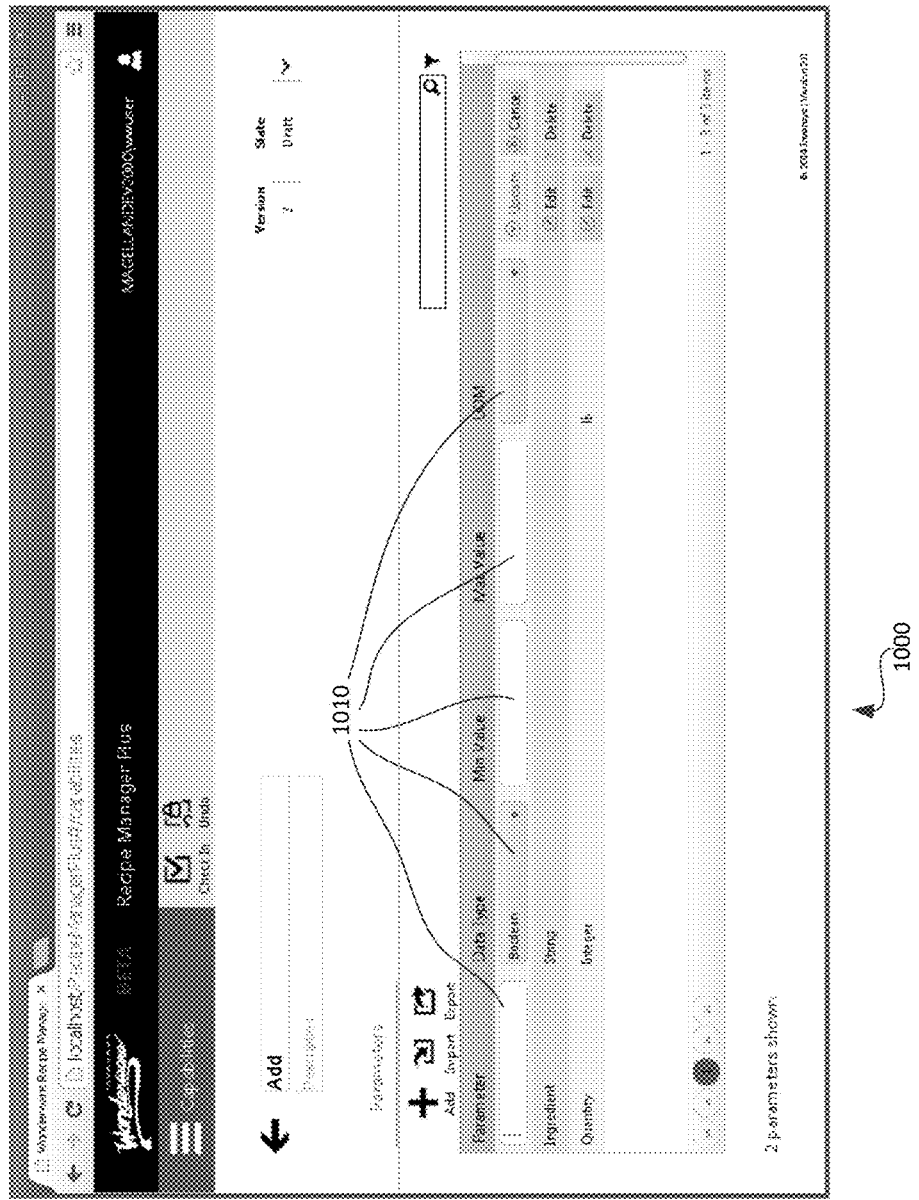
FIG. 10A is a screenshot of another capabilities detail view.

Referring to FIG. 9, selection of the capabilities selection object from the root menu view 800 navigates to a capabilities tiles view 900. From the capabilities tiles view 900, the user can select from tiles 902 representing previously configured capability models 54 in the capability library. The user can also select an add capability selection object 904 to create a new capability model. Selection of the 'Bake' capability tile 902 causes the system 10 to navigate to a capability detail view 1000 for the capability model 54 representing the capability of a piece of equipment to bake (FIG. 10). From the capability detail view 1000, the user can provide inputs editing a capability model 54. For example, in FIG. 10, the user can provide inputs to edit a capability model called 'Bake.' In FIG. 10A, the user can provide inputs to edit a capability model called 'Add.' A similar view is provided (not shown) for configuring a new capability model when the user selects the add capabilities selection object 904 from the capabilities tiles view 900 (FIG. 9). From these views, the user can provide information about a capability name and description. In addition, the capability detail views 1000 are configured to receive user inputs adding capability parameters 62 to a capability model 54 or editing capability parameters that are already assigned to the capability model. For example, from FIG. 10, the user can select the add a parameter selection object 1004 to add a parameter to the 'Bake' capability model 54. Likewise, the user can edit or delete preconfigured parameters by using the edit or delete selection objects 1006, 1008. Referring to FIG. 10A, when a new parameter is added, the user is presented with fields 1010 for receiving user inputs defining the characteristics of a parameter such as the parameter name, data type, minimum value, maximum value, or unit of measure.

Figure 11:
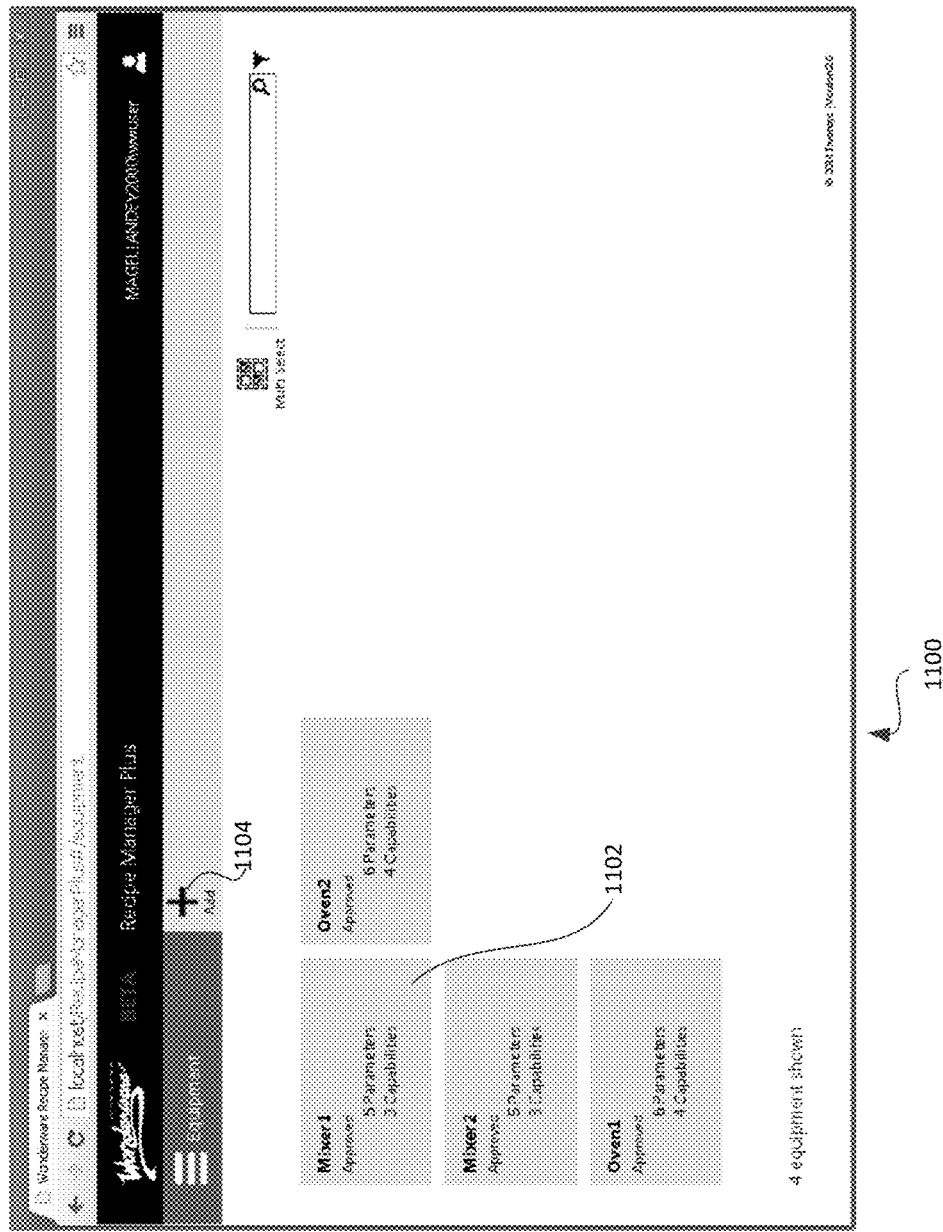
FIG. 11 is a screenshot of an equipment tiles view.
Figure 12:
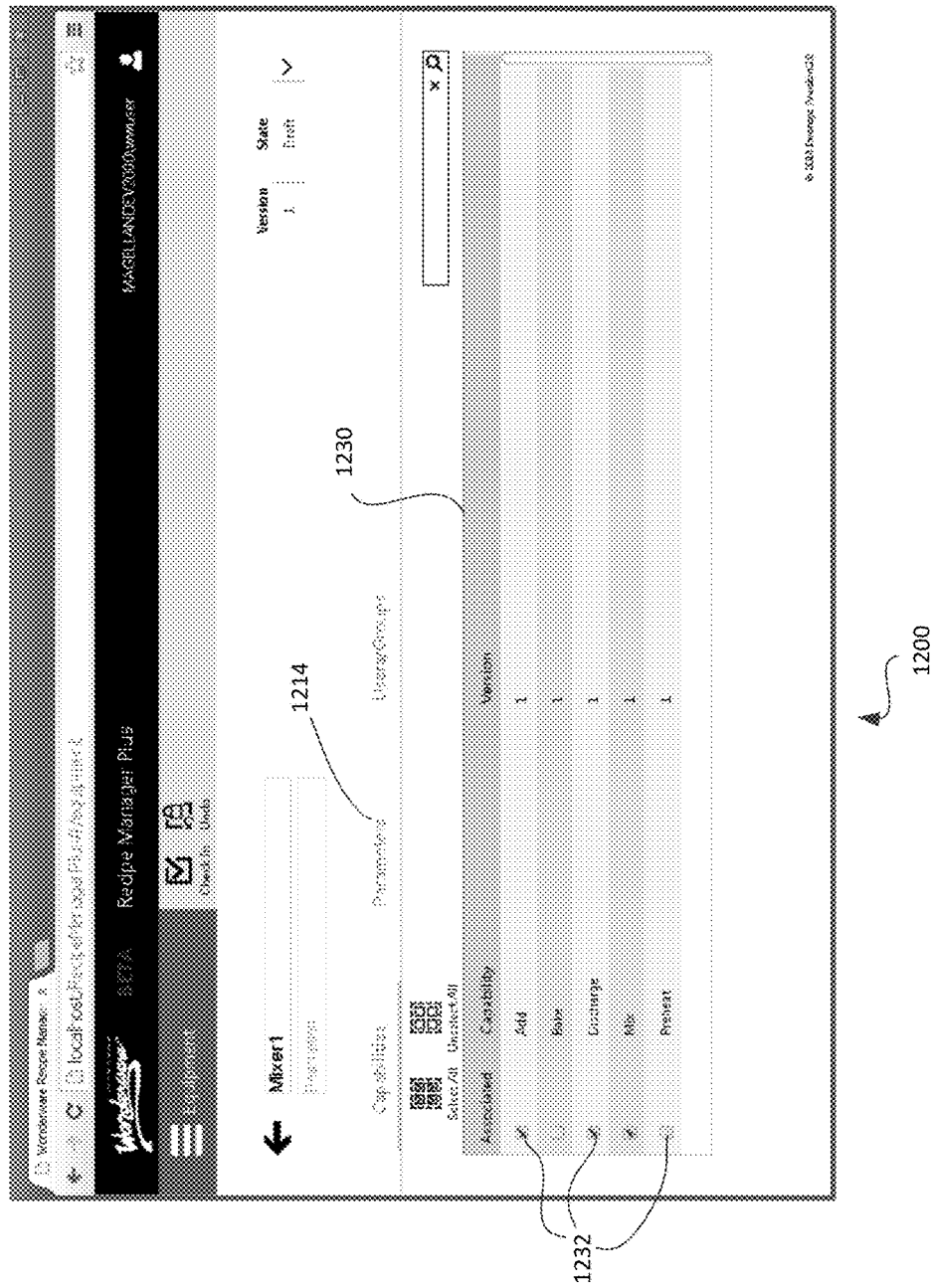
FIG. 12 is a screenshot of an equipment detail view.

Referring to FIG. 11, selection of the equipment selection object from the root menu view 800 (FIG. 8) navigates to an equipment tiles view 1100. From the tiles view 1100 the user can select from tiles 1102 representing previously configured equipment models 56. The user can also select the add button 1104 to add a new equipment model 56 to the configuration database 50. Selecting the 'Mixer1' equipment tile 1102 causes the system 10 to navigate to an equipment capabilities detail view 1200 for the equipment model 56 representing the 'Mixer1' piece of equipment 16 (FIG. 12). From the equipment capabilities detail view 1200, the user can provide inputs selecting capability models 54 for association with the equipment model 56. The illustrated equipment capabilities detail view 1200 includes a capability selection pane 1230 with selection objects 1232 for each of the capability models 54 in the capability library 52. The selection objects 1232 can be used to associate the capability models 54 in the capability library 52 with the equipment model 54 (in the illustrated view, 'Mixer1'). A similar view is provided for a new equipment model (not shown) when the user selects the add equipment selection object 1104 from the equipment tiles view 1100 (FIG. 11). From the equipment capabilities detail view 1200, the user can provide information about the name and description of an equipment model 54.

Figure 13:
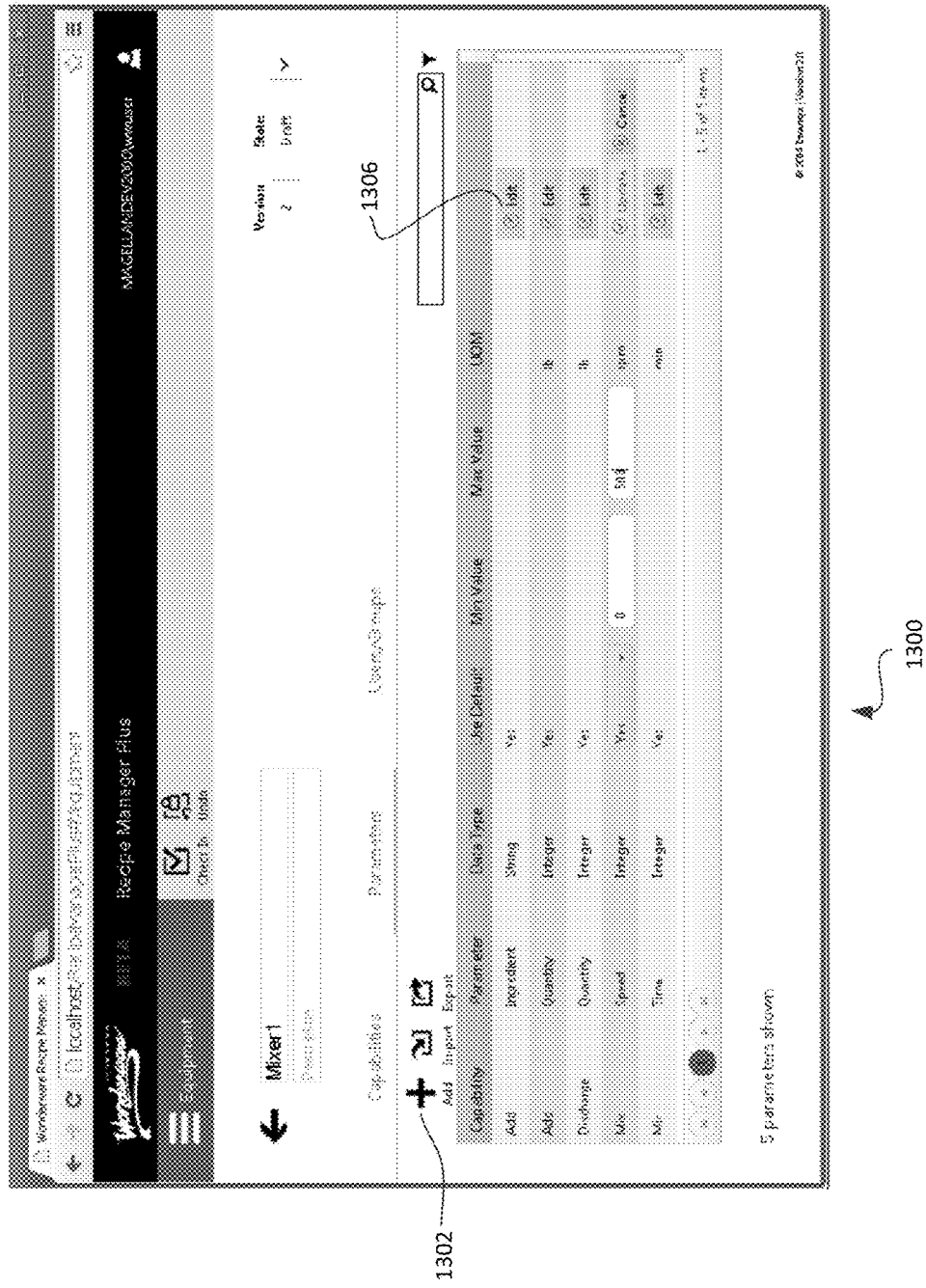
FIG. 13 is a screenshot of another equipment detail view.
Figure 14:
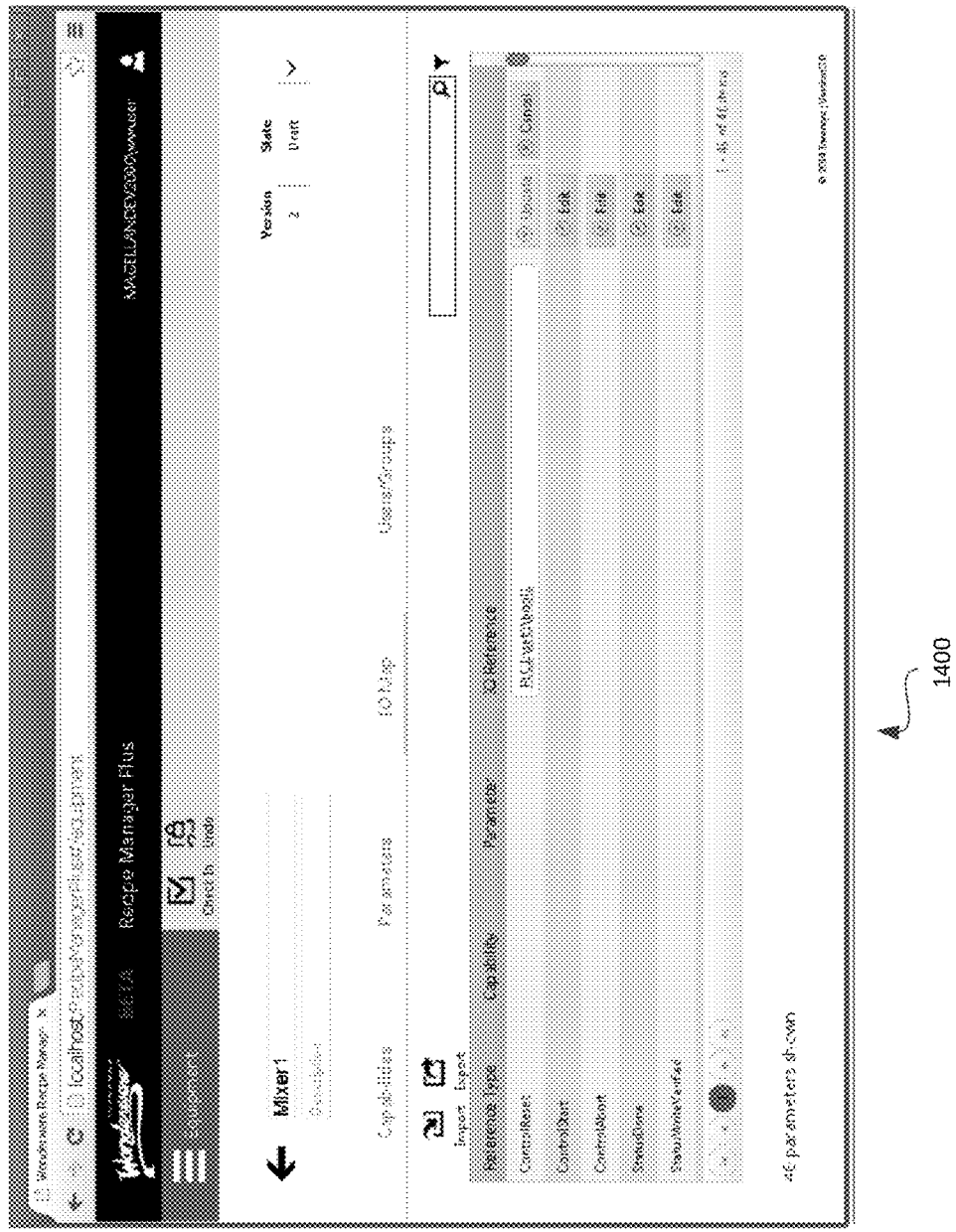
FIG. 14 is a screenshot of an input/output address configuration view.

From the equipment capabilities detail view 1200, the user can also select the parameters tab 1214 to navigate to the equipment parameters detail view 1300 (FIG. 13). The equipment parameters detail view 1300 lists all of the capability parameters 62 associated with capability models 54 that were selected from the capability library 52 using the equipment capabilities detail view 1200. In addition, the equipment parameters detail view 1300 is configured to receive user inputs editing copies 62' of the equipment parameters 62 that are associated with the equipment model 56. For example, after selecting the edit parameter selection object 1306 for a copy 62' of a capability parameter 62, the user can provide information about the parameter's name, data type, whether to use the default value for the parameter, minimum value, maximum value, or unit of measure. The equipment parameters detail view 1300 can also be used to add equipment-specific equipment parameters using the add button 1302. The exemplary user interface for the recipe management system 10 also includes an equipment 10 map screen 1400 through which the user can provide inputs associating IO addresses of a piece of equipment 16 with an equipment model 56 and its associated capability models 54 and capability parameters 62.

Figure 15:
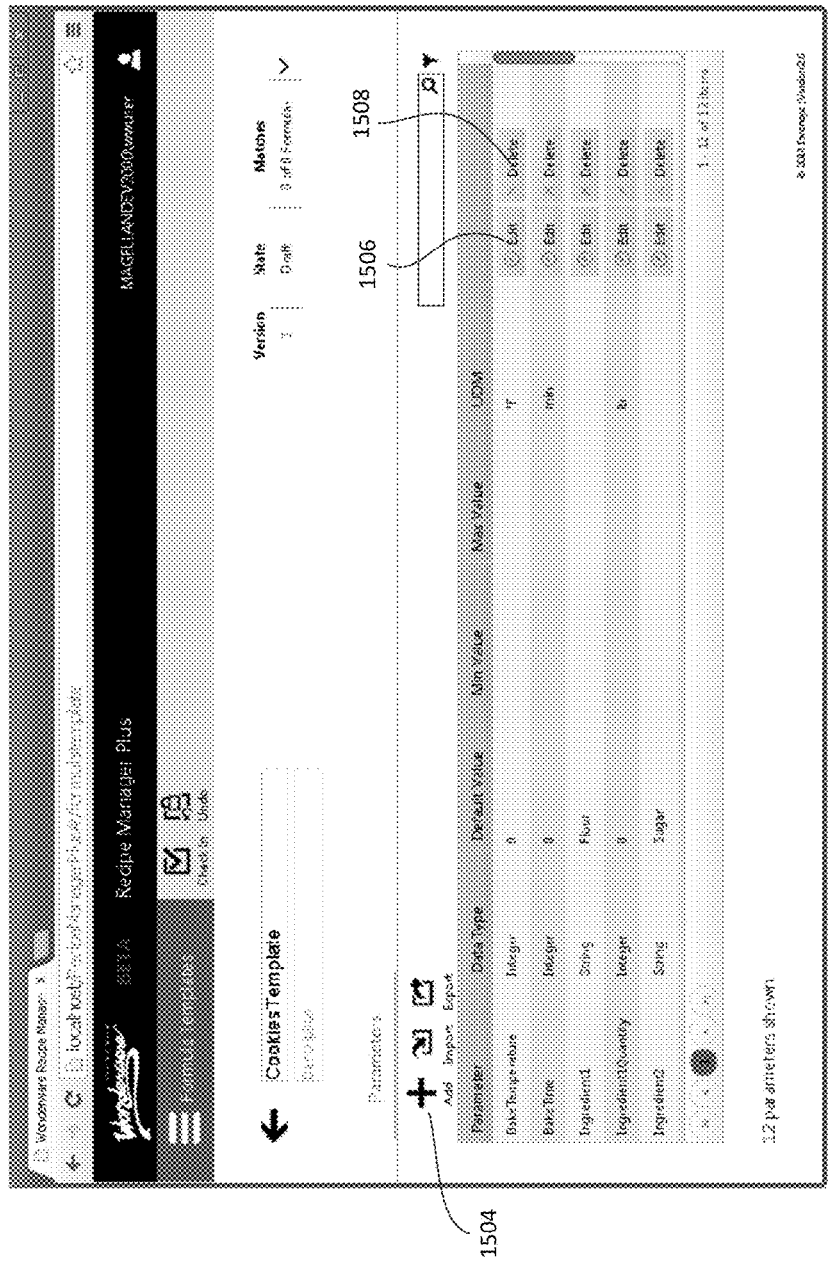
FIG. 15 is a screenshot of a formula templates detail view.

Preferably, the exemplary user interface for the recipe management system 10 includes a view for selecting from preexisting formula templates 74 and adding a new formula template (not shown). Referring to FIG. 15, the exemplary user interface for the recipe management system 10 includes a formula template detail view 1500. From the formula template detail view 1500, the user can provide inputs editing a formula template 74. For example, in FIG. 15, the user can provide inputs to edit a formula template 74 called 'CookiesTemplate.' A similar view is provided (not shown) when the user begins the process of adding a new formula template 74. From the formula template detail view 1500, the user can provide information about the name and description of a formula template 74. In addition, the formula template detail view 1500 is configured to receive user inputs adding or editing default formula parameters 76. For example, from FIG. 15, the user can select the add a parameter selection object 1504 to add a default formula parameter 76 to the 'CookiesTemplate' formula template 74. Likewise, the user can edit or delete preconfigured default formula parameters 76 by using the edit or delete selection objects 1506, 1508. For example, after selecting the edit parameter selection object 1506 for a default formula parameter 76, the user can provide information about the default formula parameter's name, data type, default value, minimum value, maximum value, or unit of measure.

Figure 16:
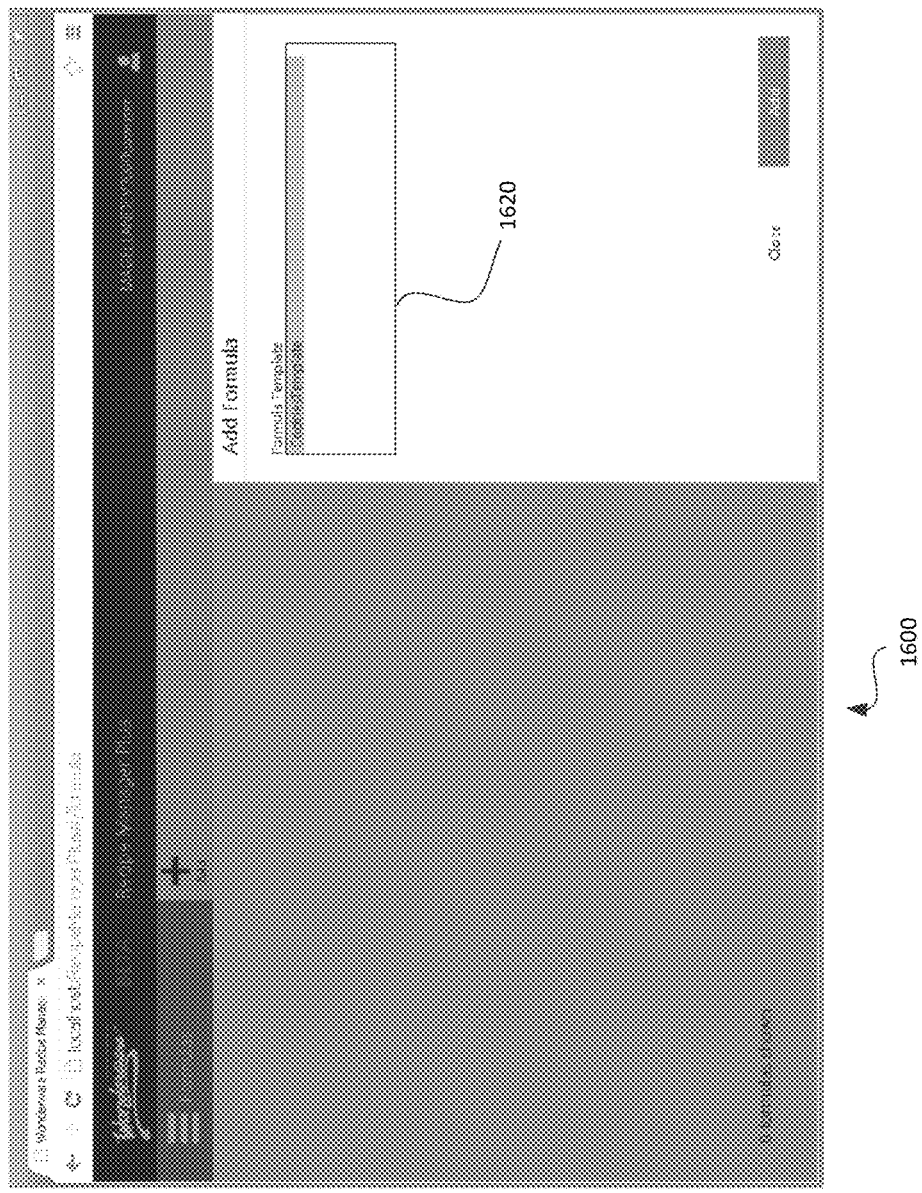
FIG. 16 is a screenshot of a formula template selection view.
Figure 17:
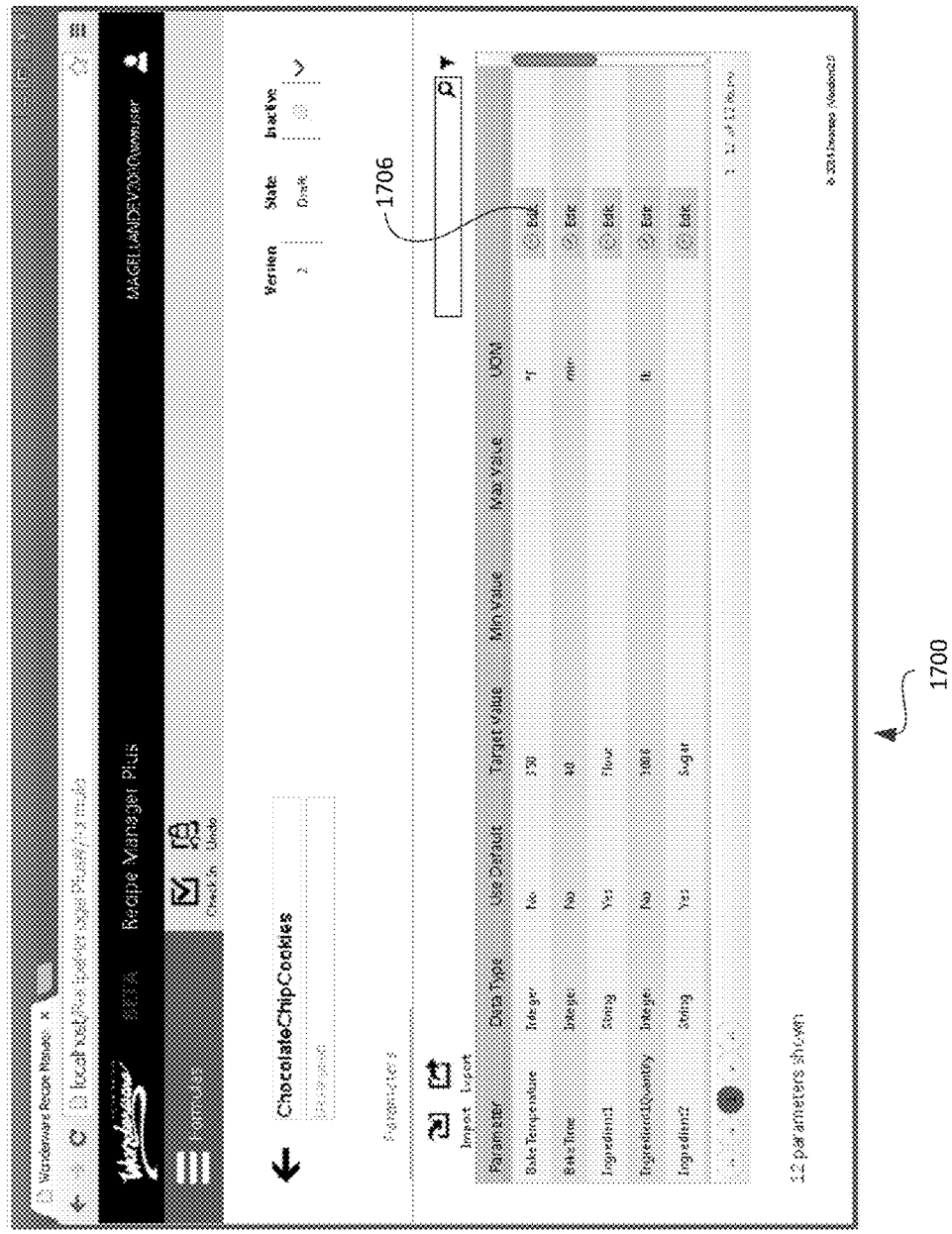
FIG. 17 is a screenshot of a formula instances detail view.

Preferably, the exemplary user interface for the recipe management system 10 includes a view for selecting from preexisting formula instances 75 and selecting to add a new formula instance (not shown). Referring to FIG. 16, the exemplary user interface for the recipe management system 10 includes a formula template selection view 1600. Using the formula template selection view 1600, a user can create a formula instance 75 from a formula template 74. A formula template selection pane 1620 is presented so that a user can select which of the configured formula templates 74 should be used to create the new formula instance 75. In the illustrated view 1600, only a 'CookiesTemplate' is configured, so the user can only select from one formula template 74. Though the illustrated view 1600 depicts one formula template 74 for selection, the same view can have more than one formula template 74 for selection when the configuration database 50 stores more than one formula template. By selecting a formula template 74 from the formula template selection view 1600, a user navigates to an add formula instance view 1700 (FIG. 17), which is prepopulated with the default data from the formula template 74 from which the new formula instance 75 was created. From the add formula instance view 1700, the user can provide inputs editing a formula instance 75. From the view of FIG. 17, the user can provide information about the name and description of a formula instance 75. In addition, the add formula instance view 1700 is configured to receive user inputs adding or editing default formula parameters 76 for a formula instance 75. For example, from FIG. 17, the user can edit override default formula parameters 76 by using the edit selection object 1706. After selecting the edit selection object 1706, the user can provide information about the data type, target value, minimum value, maximum value, or unit of measure of an overwrite formula parameter 77.

Figure 18:
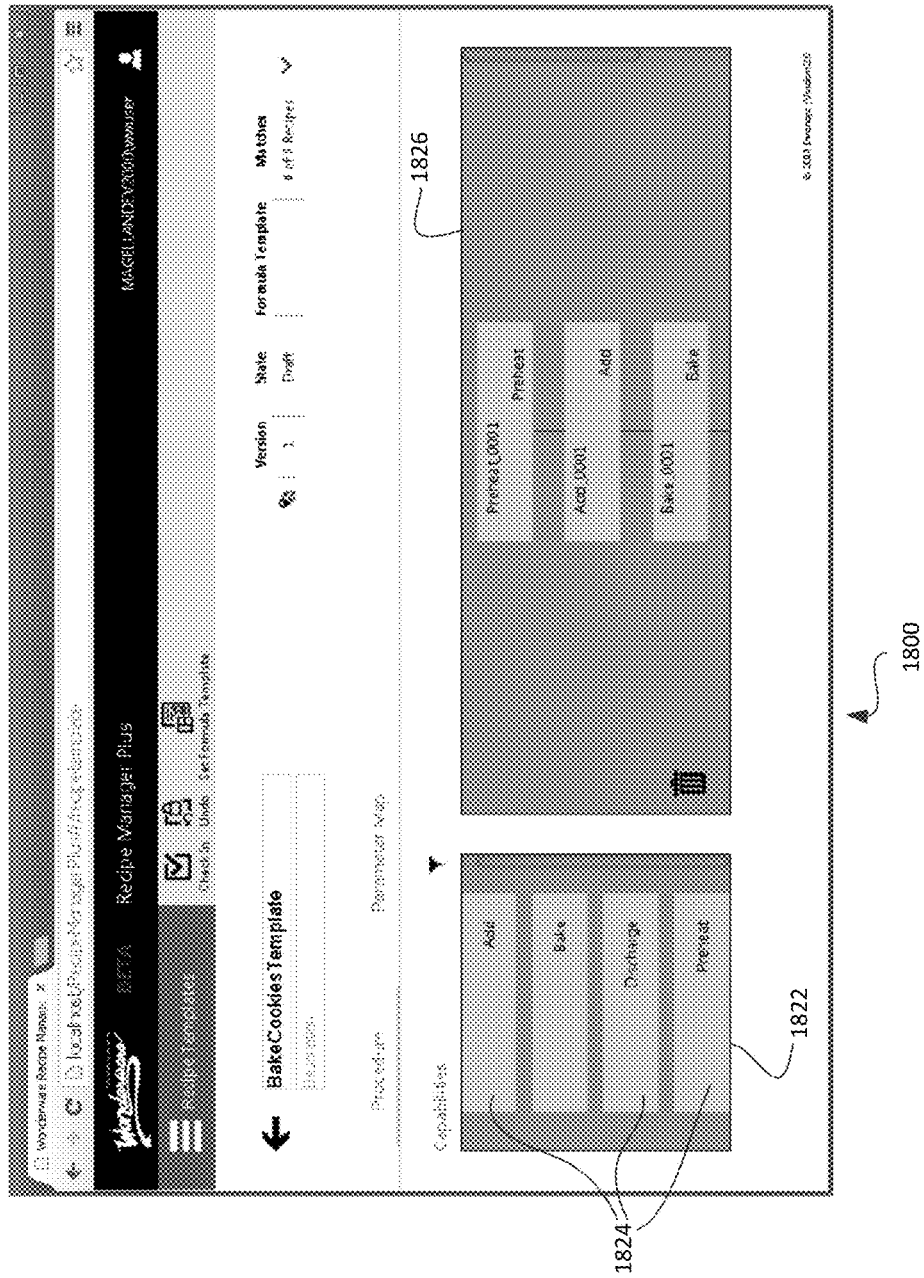
FIG. 18 is a screenshot of a procedure building view.

Preferably, the exemplary user interface for the recipe management system 10 includes a view for selecting from preexisting recipe templates 60 and selecting to add a new recipe template (not shown). Referring to FIG. 18, the exemplary user interface for the recipe management system 10 includes a procedure building view 1800 from which a user can create a procedure model 66 for a recipe template 60. Preferably, when the user provides an input requesting creation of a new recipe template 60, the recipe management system 10 navigates to the procedure building view 1800. The procedure building view 1800 includes a library pane 1822 displaying selection objects 1824 for each of the capability models 54 in the capability library 52. By selecting the selection objects 1824 from the library pane 1822, the user can add capability models 54 to the work area 1826, where they can be arranged in the desired sequence for the procedure model 66. Thus, selecting the capability selection objects 1824 from the library pane 1822 is one suitable user input that associates a capability model 54 with a recipe model 58.

Figure 19:
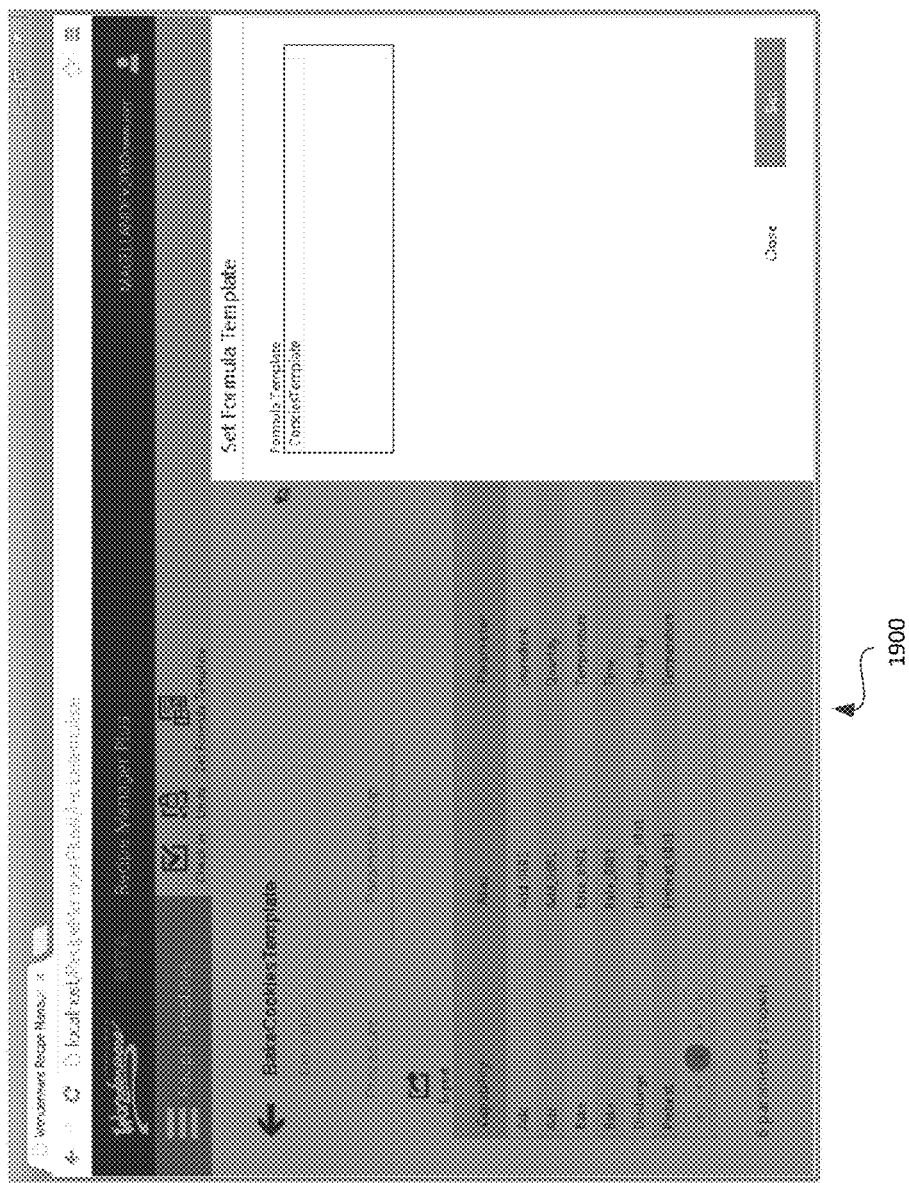
FIG. 19 is a screenshot of another select formula template view.
Figure 20:
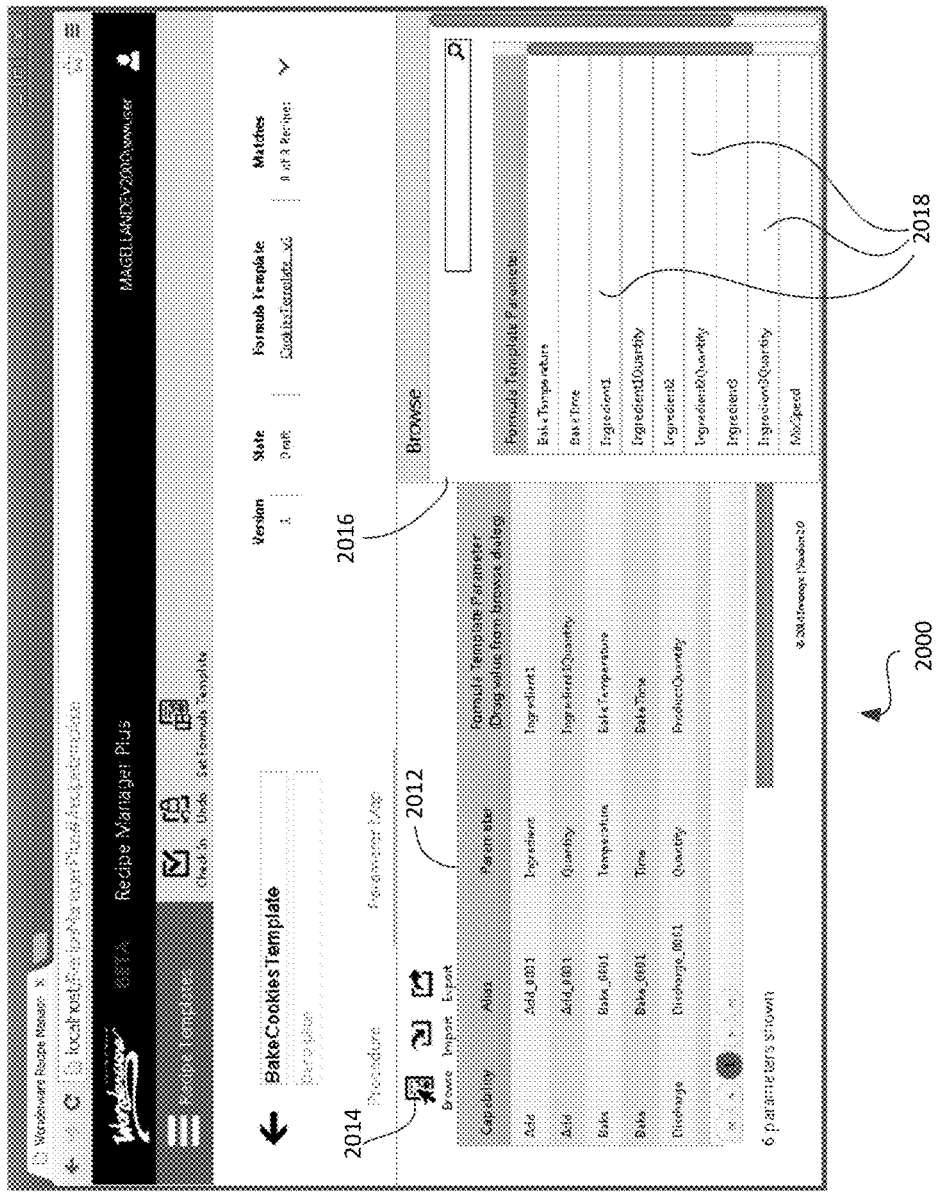
FIG. 20 is a screenshot of a recipe templates detail view.

Referring to FIG. 19, the exemplary user interface for the recipe management system 10 includes a formula template selection view 1900 for selecting a formula template 74 to associate with a recipe template 60. Though the illustrated view 1900 depicts one formula template 74 for selection, the same view can have more than one formula template 74 for selection when the configuration database 50 stores more than one formula template. By selecting a formula template 74 from the formula template selection view 1900, a user navigates to a recipe template parameter map view 2000 (FIG. 20), which is prepopulated with the default data from the formula template 74 selected at the formula template selection view 1900. From the recipe template parameter map view 2000, the user can provide inputs mapping parameters from the selected formula template 74 to the capability parameters 62 assigned to the capability models 54 used in the procedure model 66, which was configured using the procedure building view 1800. The capability parameters 62 assigned to the capability models 54 are automatically added to the capability parameters grid 2012. Using the browse selection icon 2014, the user navigates to a browse table 2016. The browse table 2016 has selection objects 2018 for each of the default formula parameters 76 in the selected formula template 74. By selecting a selection object 2018, the user selects a default formula parameter 76 for association with a capability parameter 62. The recipe management system 10 automatically maps the default formula parameter 76 to the capability parameter 62 as described above.

Figure 21:
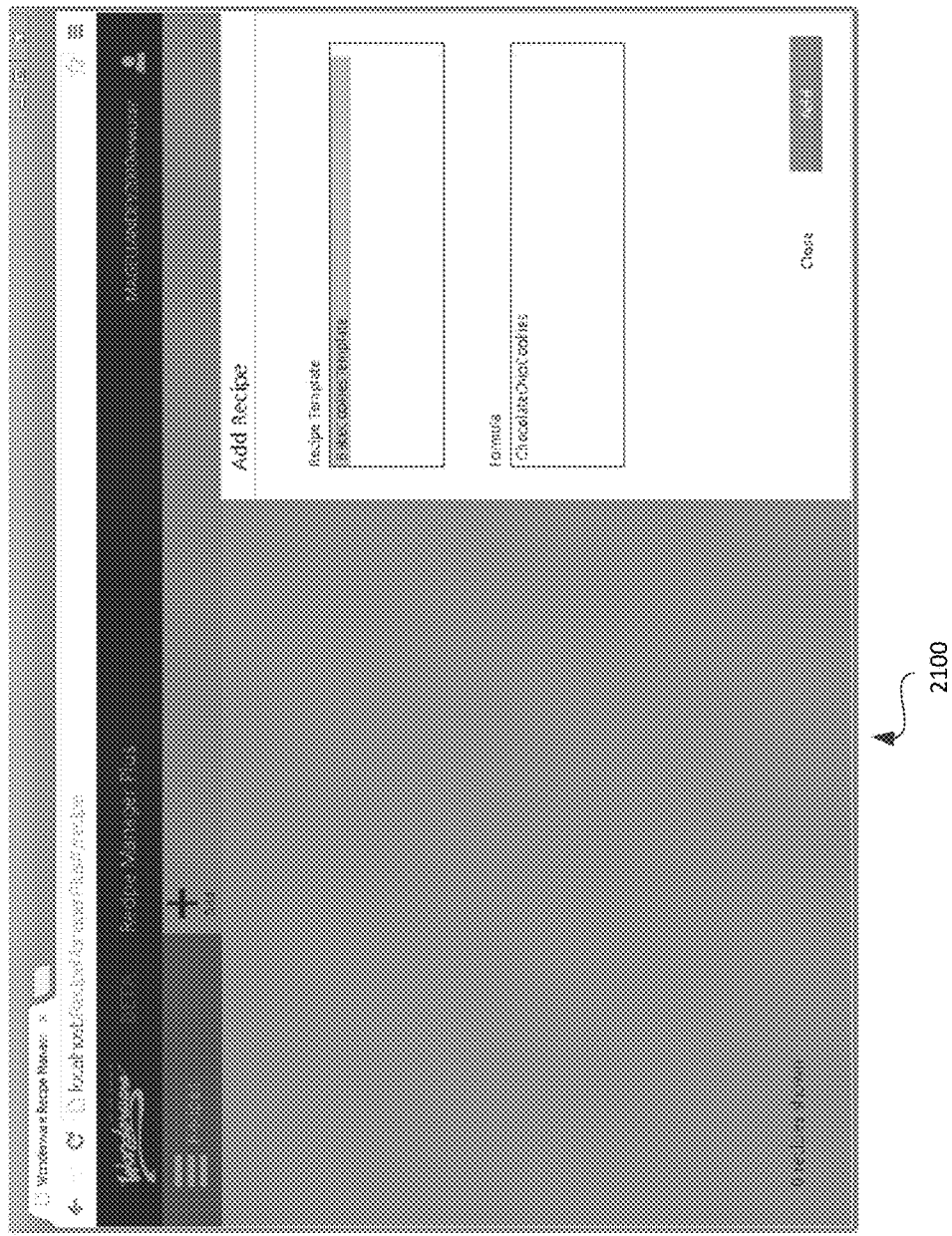
FIG. 21 is a screenshot of a select recipe template and formula instance view.
Figure 22:
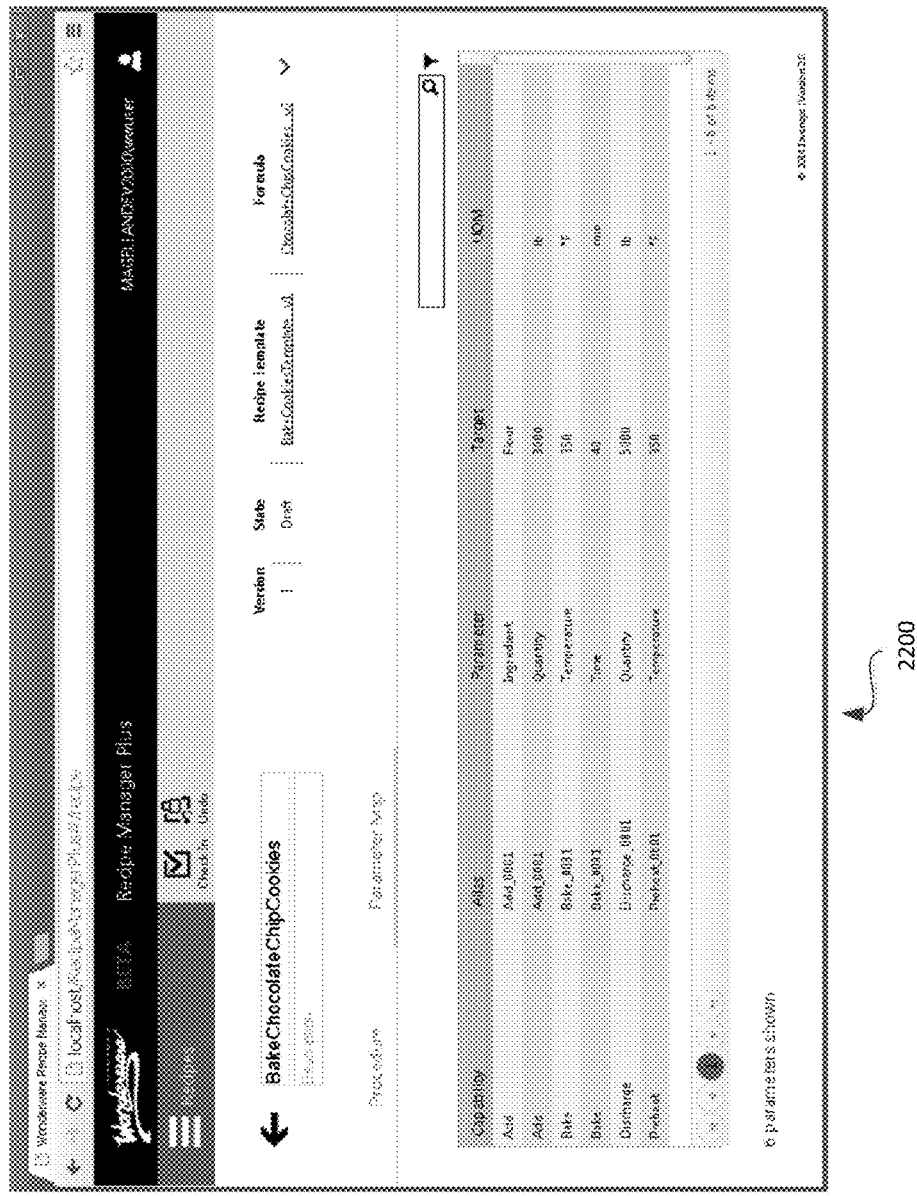
FIG. 22 is a screenshot of a recipe instances detail view.

Referring to FIG. 21, the exemplary user interface for the recipe management system 10 includes a recipe template and formula instance selection view 2100 for selecting a recipe template 60 and formula instance 75 from which to create a recipe instance 61. Though the illustrated view 2100 depicts one recipe template 60 and one formula instance 75 for selection, the same view can have more than one recipe template 60 and more than one formula instance 75 for selection when the configuration database 50 stores more than one recipe template and more than one formula instance. Preferably, the selection view 2100 displays only formula instances 75 that are compatible with the selected recipe template 60. As discussed above, when the recipe template 60 is created, it is assigned a formula template 74. The formula instances 75 that are compatible with the recipe template 60 are those formula instances that are created from the formula template 74 that is used in the recipe template. By selecting a recipe template 60 and a formula instance 75 from the section view 2100, the user creates a new recipe instance 61 and navigates to the recipe instance detail view 2200 (FIG. 22). The recipe instance detail view 2200 depicts information about the recipe instance 61 including its name and a listing of parameters.

Figure 23:
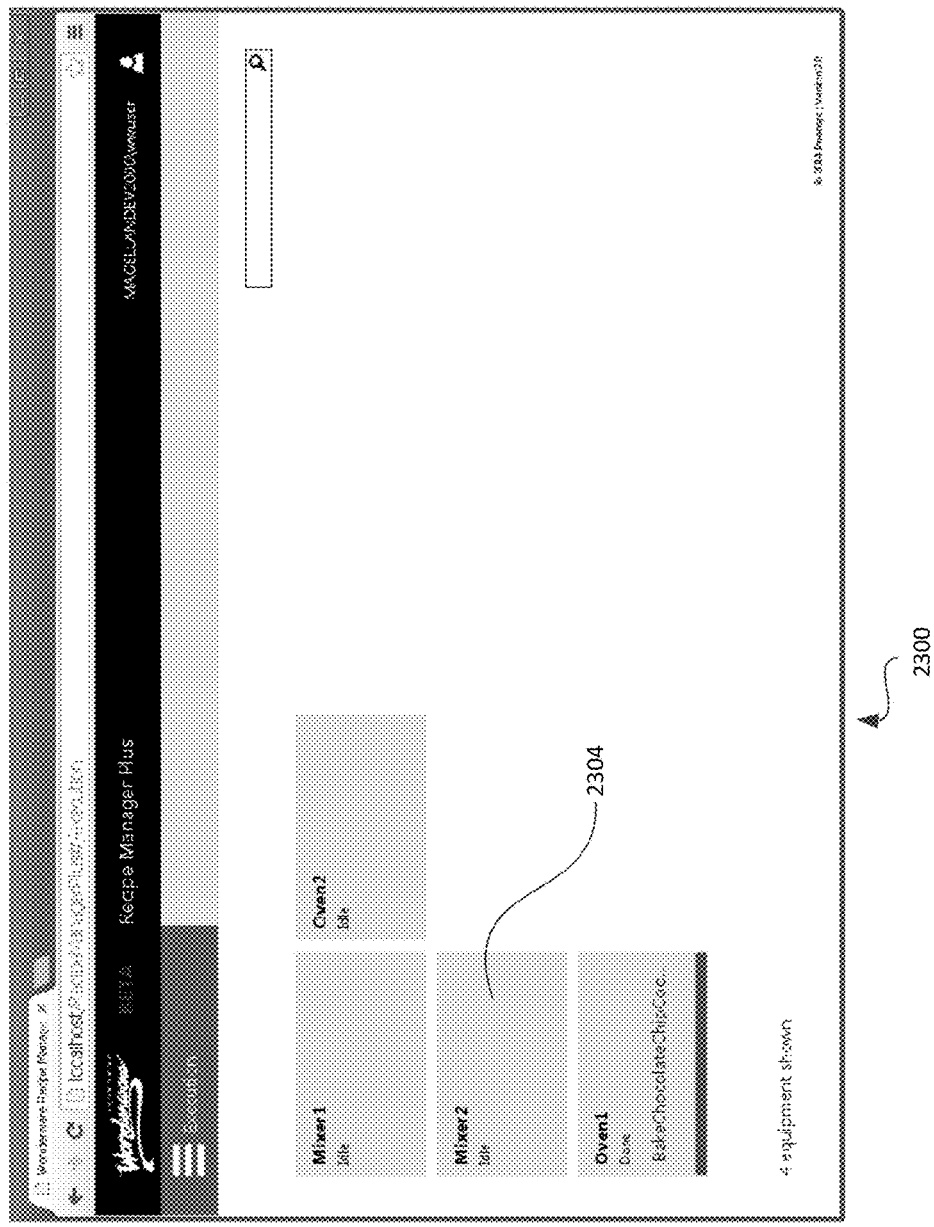
FIG. 23 is a screenshot of an execution tiles view.
Figure 24:
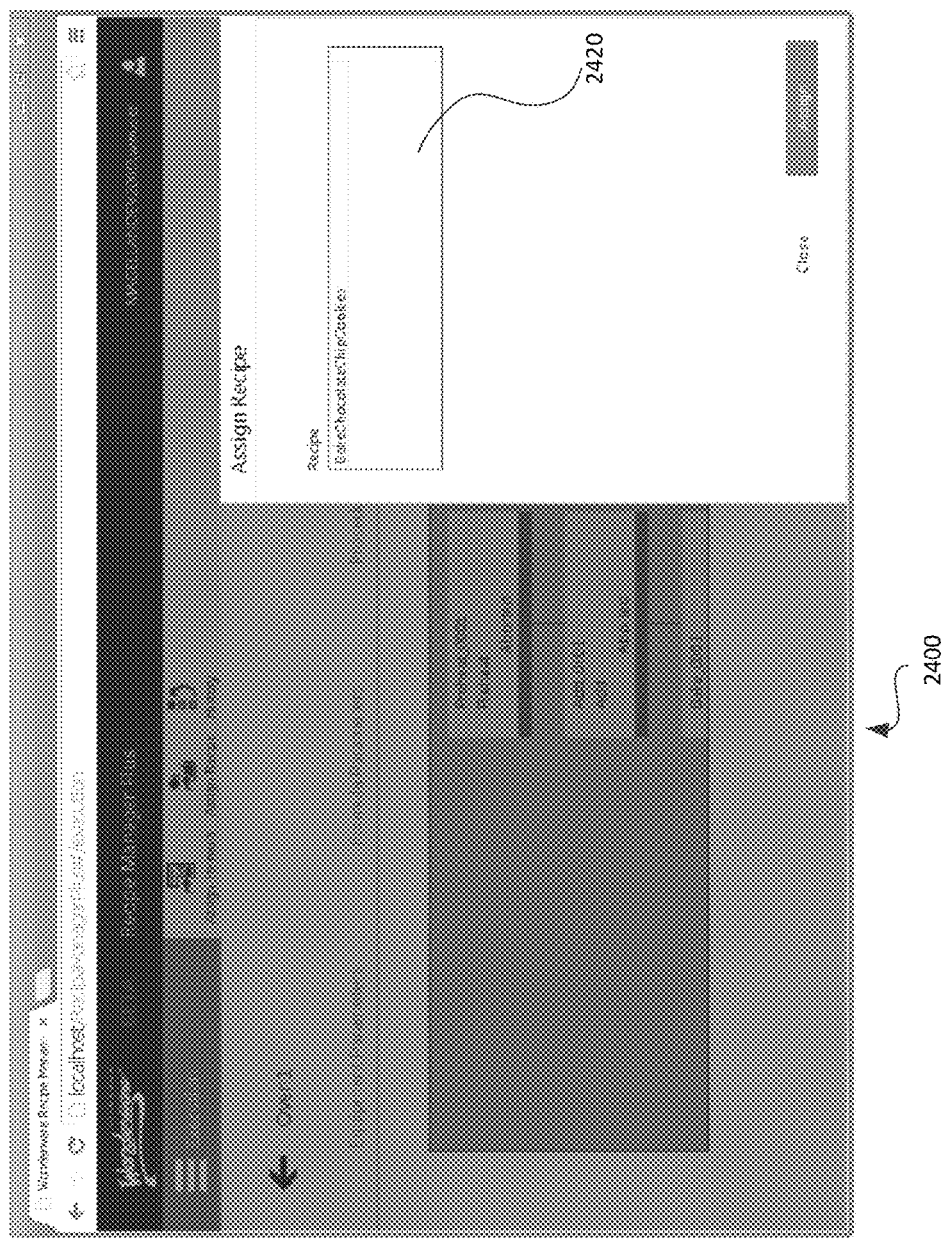
FIG. 24 is a screenshot of a select recipe instance view.
Figure 25:
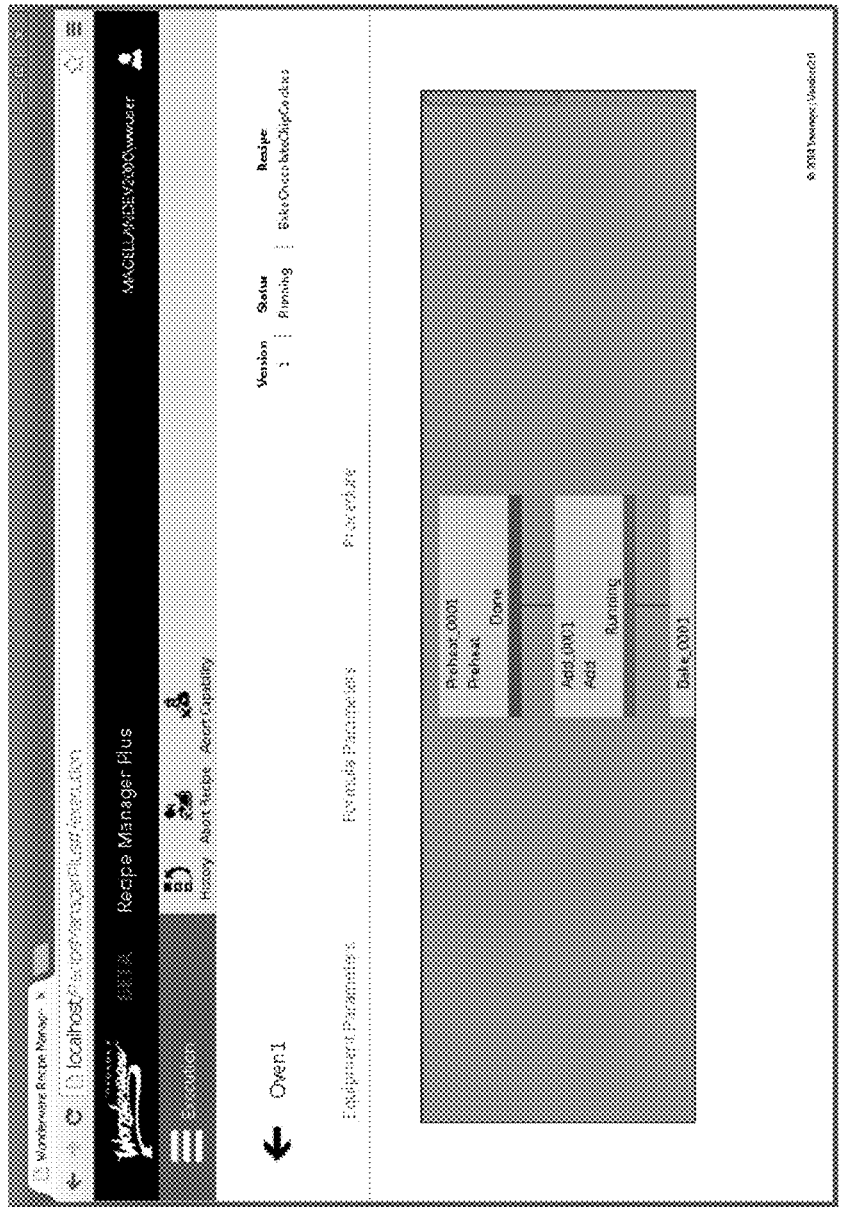
FIG. 25 is a screenshot of an execution detail view.

From the root menu 800 (FIG. 8), the user can select the execution selection object to navigate to an execution tiles view 2300 (FIG. 23). The execution tiles view 2300 depicts one tile 2304 for each equipment model 56 that is capable of being used to execute a recipe. Each tile 2304 displays information about the runtime status of the piece of equipment 16 it represents. By selecting one of the equipment tiles 2304, the user navigates the recipe management system 10 to an assign recipe view 2400 (FIG. 24). The assign recipe view 2400 includes a recipe assignment pane 2420 from which the user can select a recipe model 58 (based on the name of a recipe instance 61) for executing on the piece of equipment 16 represented by the equipment model 56 that was chosen from the tiles view 2300 (FIG. 23). Preferably, the assign recipe view 2400 displays only those recipe models 58 associated with capability models 54 with which the selected equipment model 56 is also associated. Thus, when the user selects a recipe model 58 from the assign recipe view 2400, the selected recipe will only require capabilities of the selected piece of equipment. When the recipe model 58 is selected, the recipe management system 10 creates a control recipe model 90 from the recipe model 58, maps the control recipe model to the equipment model 56, and navigates to the execution detail view 2500 (FIG. 25). From the execution detail view 2500, the user can control various aspects of recipe execution.

Figure 26:
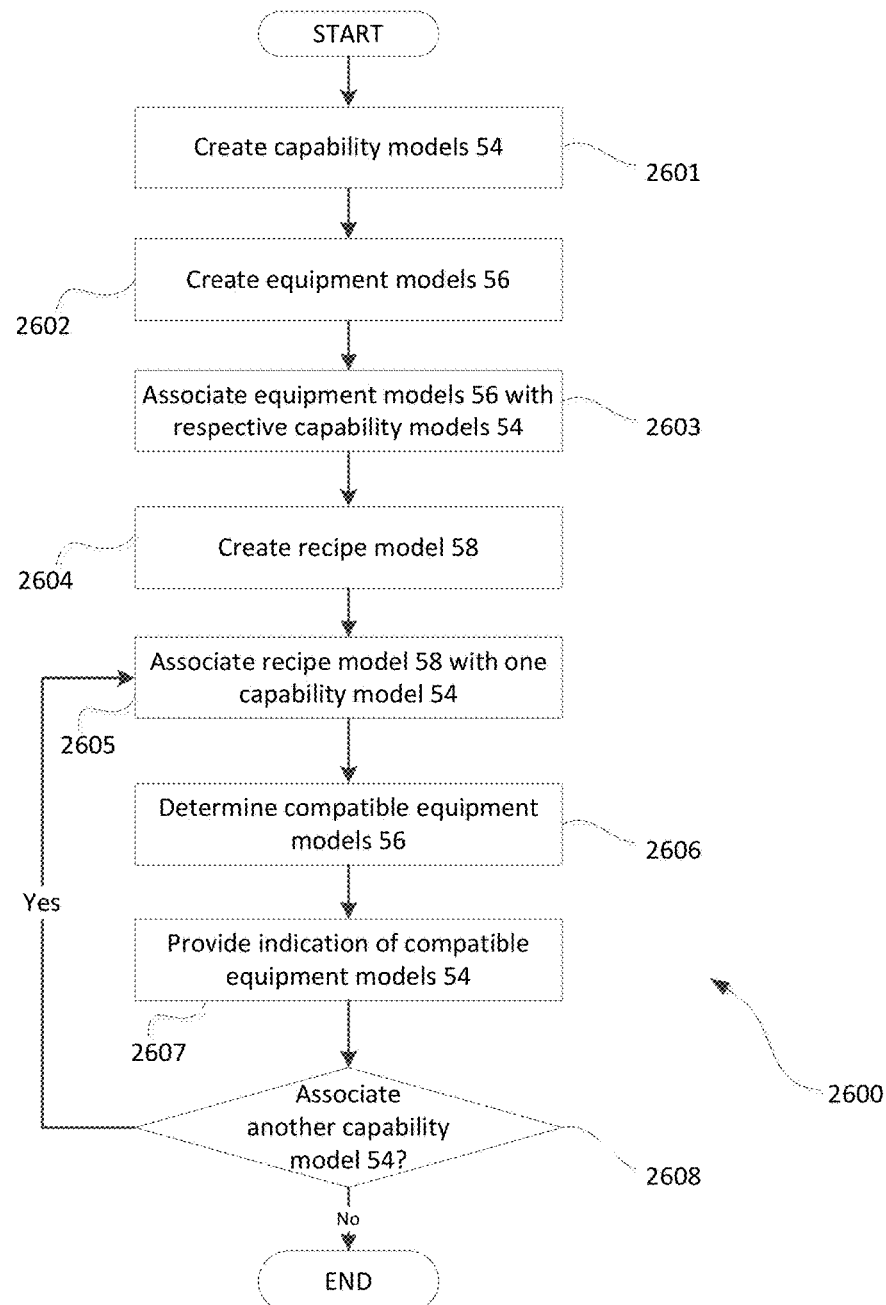
FIG. 26 is a flowchart illustrating the steps and decision point of a method to determine compatible pieces of equipment.

Referring to FIG. 26, the illustrated recipe management system 10 includes a compatibility filtering system for determining models of one type that are compatible for association with models of another type based on mutually shared characteristics. In the illustrated embodiment, the compatibility filtering system is configured to perform a method 2600 to determine the list of equipment models 56 that are compatible with a certain recipe model 58 based on their shared association(s) with the same capability model(s) 54. However, it will be understood, that the compatibility filtering system could be applied to models of different types in different supervisory control systems without departing from the scope of the invention. For example, the principles set forth below could be expanded to any supervisory control system in which the compatibility of two types of models is dependent on one or more shared associations with another type of model. Likewise, the principles set forth below could be expanded to other supervisory control systems in which the compatibility of two types of models is dependent on another mutual characteristic such as mutual inclusion of the same data, etc.

In certain embodiments of the recipe management system 10, a recipe model 58 can only be used to execute a recipe on a single piece of equipment 56. Thus a recipe model 58 that is associated with a set of capability models 54 that are not also associated with a single equipment model 56 cannot be used to execute a recipe in such systems. The compatibility filtering system of the recipe management system 10 helps provide context clues that eliminate the possibility that the user will create a recipe model 58 that cannot be used because none of the equipment models 56 are associated with the correct capability models 54.

FIG. 26 illustrates a compatibility determination method 2600 for determining the compatibility of a recipe model 58 with the equipment models 56 stored in the configuration database 50 as the recipe model is being created. At a first step 2601 of the method 2600, the recipe management system 10 creates the capability models 54 in a capability library in response to user inputs. At a second step 2602, the recipe management system creates equipment models 56 representing each of the pieces of equipment 16 in the process plant 18 in response to user inputs. At the third step 2603, the recipe management system 10 associates the equipment models 56 with the respective capability models 54 in response to user inputs. After associating each of the equipment models 56 with their respective capability models 54, the recipe management system 10 creates a recipe model 58 in response to user inputs (step 2604). The method 2600 can be applied broadly to various aspects of the recipe management system 10. Thus it is contemplated that the create recipe model 58 step 2604 could, for example, include creating a recipe template 60 or creating other aspects of the recipe model 58. When a recipe model is organized differently than is illustrated in FIG. 7, the create a recipe model 58 step 2604 can, without departing from the scope of the invention, include creating other aspects of a recipe model other than those expressly identified in the present disclosure.

At step 2605, a capability model 54 is associated with the recipe model 58. After associating the capability model 54 with the recipe model 58 the recipe management system 10 determines at step 2606 which of the equipment models 56 are compatible with the recipe model 58 based on a mutual association with the capability model 54. Subsequently, the recipe management system 10 provides an indication of the equipment models 56 that are compatible with the recipe model 58 (step 2607). If another capability model 54 is to be added to the recipe model 58 (decision block 2608), the recipe management system repeats steps 2605-2607 for the new capability model. If not, the method 2600 ends. Referring to FIG. 18, it is contemplated that the procedure building view 1800 could include a list of compatible equipment models 56 displayed somewhere within the view. As capability models 54 are selected from the library pane 1822, the list of compatible equipment models 56 will be adjusted to include only those equipment models 56 that are associated with the capability models 54 that have been selected from the library pane 1822. Referring again to FIG. 26, though the illustrated embodiment of the method 2600 provides an indication of the compatible equipment models 54 (step 2607) after the recipe model 58 is associated with each new capability model 54, it is contemplated that in other embodiments the indication will not be provided each time the recipe model 58 is associated with a new capability model. Rather, the indication can in certain embodiments be provided only when the user has reason to consider what equipment models 56 are compatible with the recipe model 58. For example, referring to FIG. 23, when the execution tiles view 2300 is accessed, it can provide, for each equipment model 56, an indication of the compatible recipe models 58, thereby providing, for each recipe model 58, an indication of the compatible equipment models 56. The compatibility filtering system and method 2600 can be used in still other ways without departing from the scope of the invention.

Figure 27:
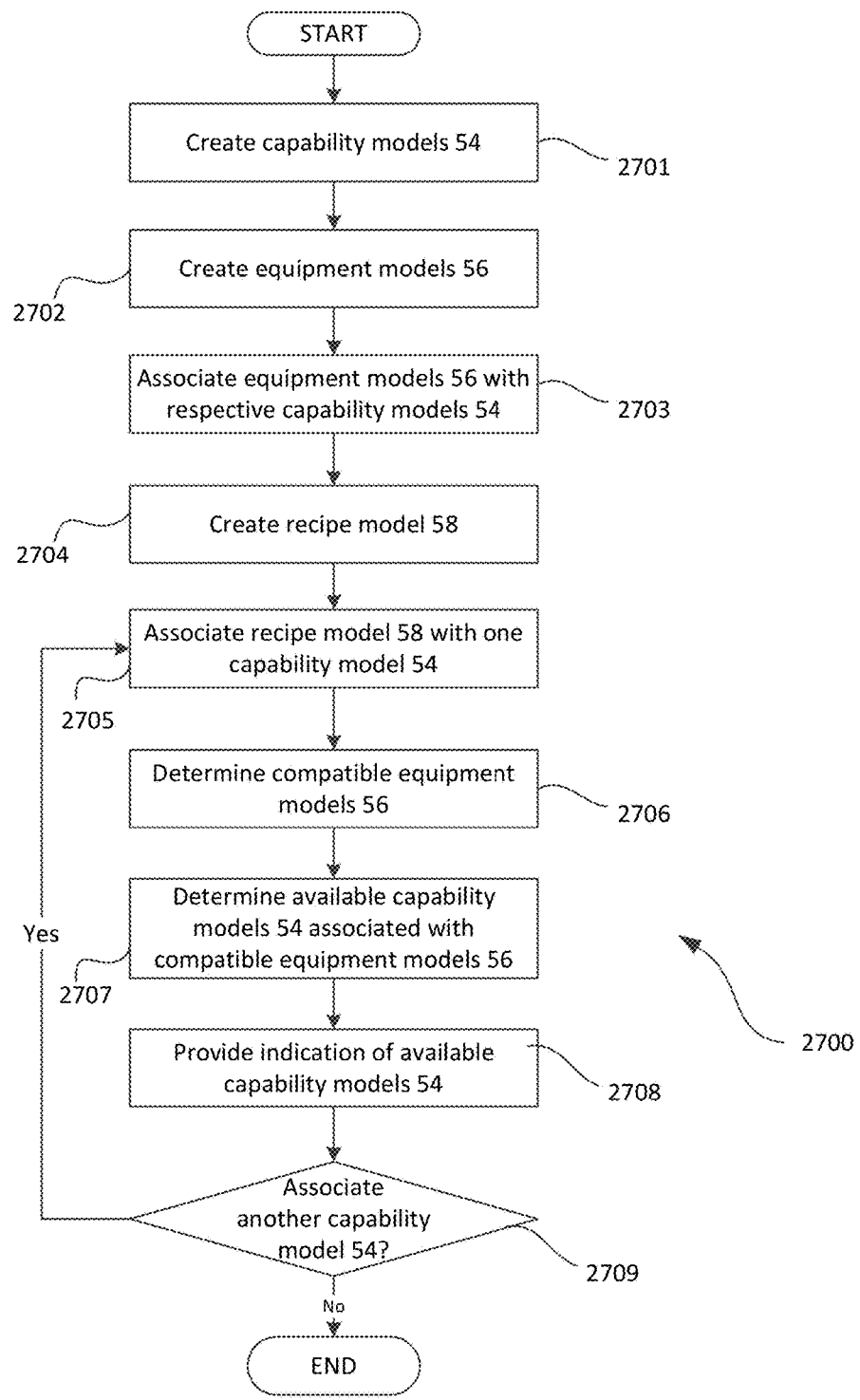
FIG. 27 is a flowchart illustrating the steps and decision point of a method to determine available capabilities.

Referring to FIG. 27, the compatibility filtering system is also able to perform the filtering method 2700 for determining the available capability models 54 that can be associated with a recipe model 58 based on the associations between the capability models 54 and the equipment models 56. At a first step 2701 of the method 2700, the recipe management system 10 creates the capability models 54 in a capability library in response to user inputs. At a second step 2702, the recipe management system 10 creates equipment models 56 representing each of the pieces of equipment 16 in the process plant 18 in response to user inputs. At the third step 2703, the recipe management system 10 associates the equipment models 56 with the respective capability models 54 in response to user inputs. After associating each of the equipment models 56 with their respective capability models 54, the recipe management system 10 creates a recipe model 58 in response to user inputs (step 2704). Like the method 2600 (FIG. 26) the method 2700 can be applied broadly to various aspects of the recipe management system 10. Thus it is contemplated that the create recipe model 58 step 2704 could, for example, include creating a recipe template 60 or creating other aspects of the recipe model 58. When a recipe model is organized differently than is illustrated in FIG. 7, the create a recipe model 58 step 2604 can include creating other aspects of a recipe model other than those expressly identified in the present disclosure without departing from the scope of the invention.

At step 2705, a capability model 54 is associated with the recipe model 58. After associating the capability model 54 with the recipe model 58 the recipe management system 10 determines which of the equipment models 56 are compatible with the recipe model 58 based on a mutual association with the capability model 54 (step 2706). The compatible equipment models 56 are those that are associated with the capability model 54 that is selected for association with the recipe model 58. Based on the determined list of compatible equipment models 56, at step 2707, the recipe management system 10 determines which of the capability models 54 in the capability library 52 are compatible with the list of compatible equipment models 56. For each of the compatible equipment models 56, the recipe management system 10 determines which capability models 54 are associated therewith. The recipe management system creates a list of these capability models 54 and, at step 2708, provides an indication that each of these capability models 54 is available to be associated with the recipe. For example, referring to the procedure building view 1800 of FIG. 18, when a capability model 54 is associated with the procedure model 66, the recipe management system 10 will display in the library pane 1822 only those capability models that are associated with the equipment models 56 with which each of the capability models in the work area 1826 is also associated. If another capability model 54 is to be associated with the recipe model 58 (decision block 2709), the recipe management system repeats steps 2705-2707 for the newly associated capability model. If not, the method 2700 ends.

Figure 28:
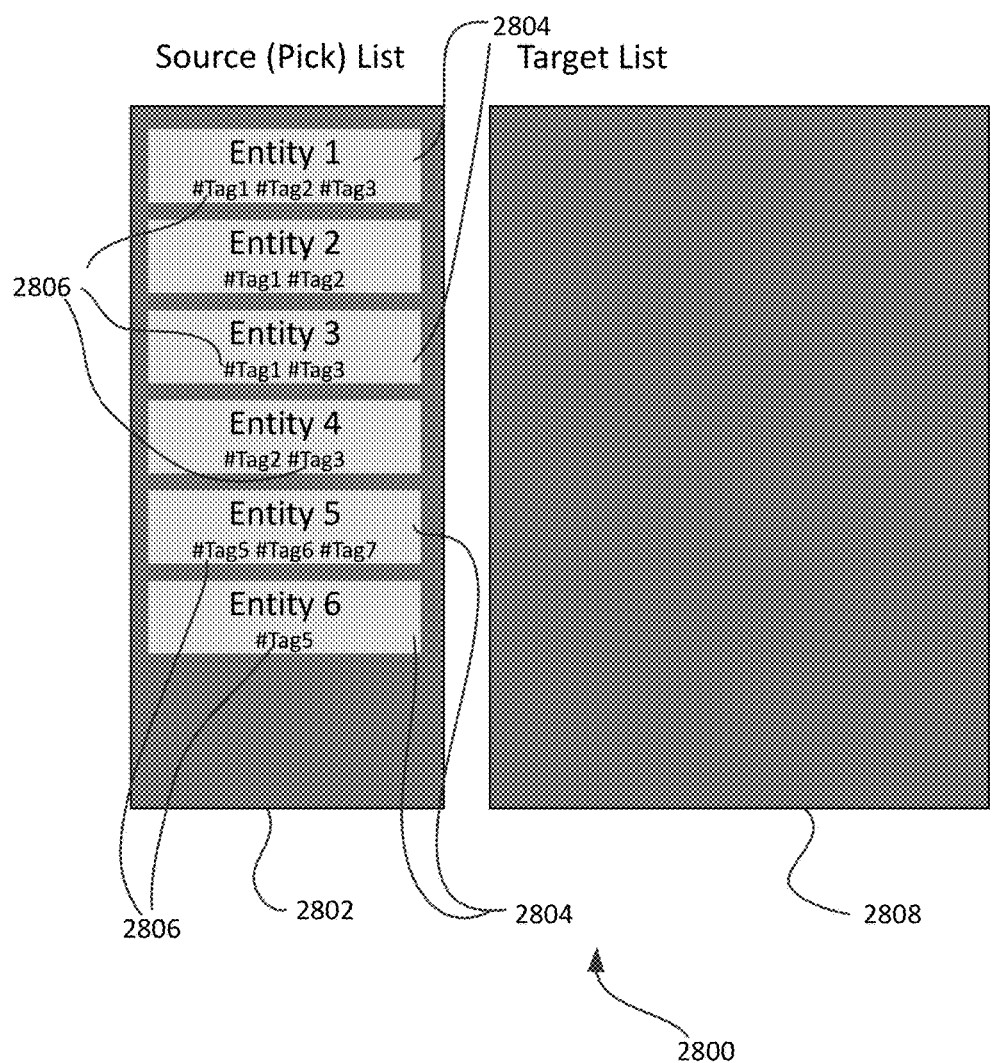
FIG. 28 is a schematically illustrated user interface including a library of entity models of a first type.
Figure 29:
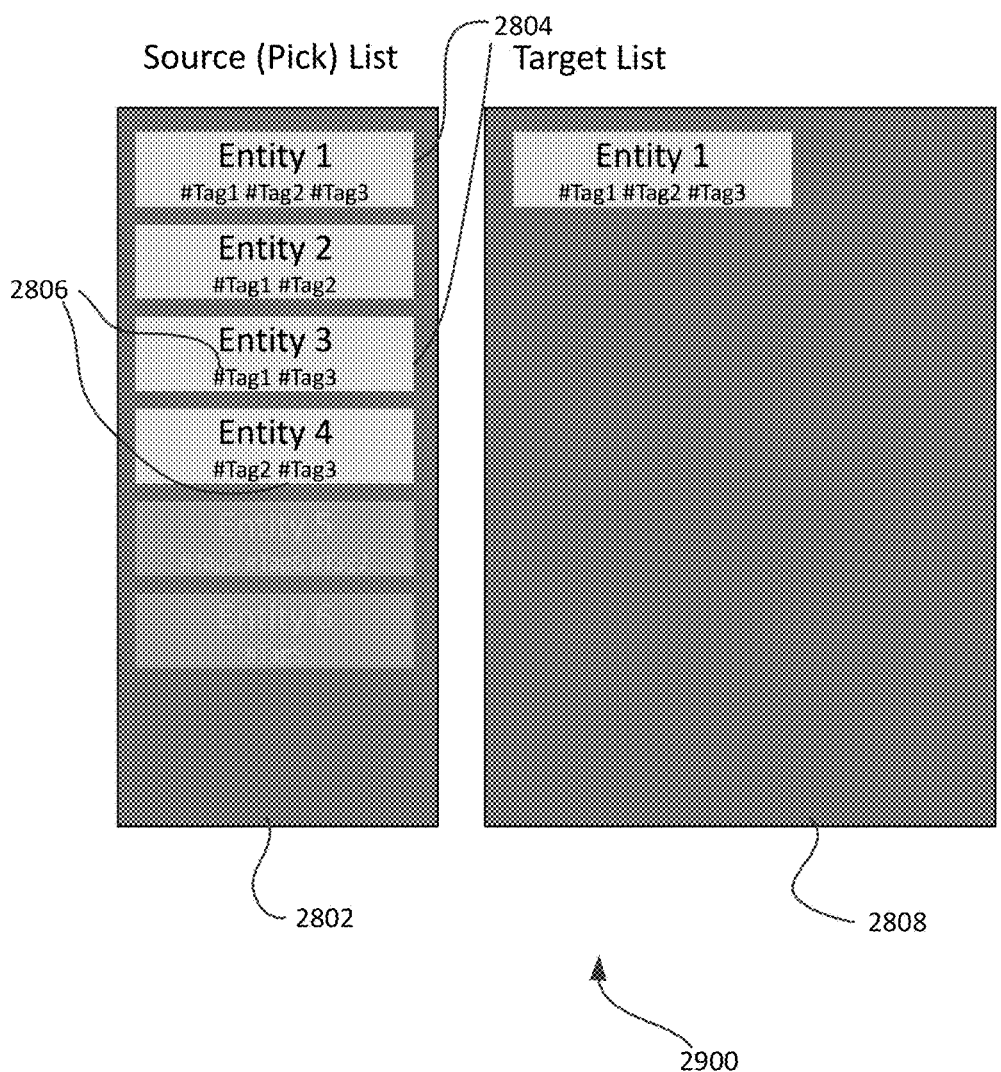
FIG. 29 is a schematically illustrated user interface including the library of entity models of the first type after one of the entity models has been selected.

Referring to FIGS. 28-29, the method 2700 can be applied more broadly in the context of a suitable industrial control system. For example, the method 2700 can performed in any industrial control system (e.g., a supervisory control system, a control monitoring system, or a control simulation system) that creates entity models of first, second, and third types. An entity model can represent an entity in a process plant (e.g., a recipe, piece of equipment, etc.). In addition, entity models can store other data that is used by the industrial control system in association with entity models of different types. Referring to FIG. 28, the industrial control system preferably provides a user interface 2800 for creating entity models and creating associations between entity models of different types. In the illustrated embodiment, the industrial control system creates entity models of a first type in response to user inputs. In the illustrated example, a source list 2802 displays a list of the available entity models 2804 of the first type. The industrial control system also creates entity models of a second type (not shown) in response to user inputs. In response to user inputs, the industrial control system associates entity models 2804 of the first type with the entity models of a second type (not shown). In the illustrated embodiment, the industrial control system uses tags 2806 to create associations between the entity models 2804 of the first type and the entity models of the second type (not shown). However, it will be understood that other kinds of associations between entity models 2804 of the first type and entity models of the second type can be used without departing from the scope of the invention.

The industrial control system also creates an entity model of a third type in response to user inputs. Preferably, the industrial control system is configured to associate the entity models 2804 of the first type with the entity model of the third type in response to user inputs. In the illustrated user interface 2800, the user can select entity models 2804 from the source list for association with the entity model of the third type. Other user interfaces for facilitating association between entity models of the first type and entity models of the third type can also be used without departing from the scope of the invention. The associations between the entity models 2804 of the first type and the entity model of the third type can be made in any suitable way without departing from the scope of the invention. When an entity 2804 is selected for association with the entity of the third type, the industrial control system determines which of the created entity models of the second type are associated with the selected one of the entity model 2804 of the first type. For example, in the illustrated embodiment, the industrial control system reads the tags associated with the selected entity model 2804 of the first type. Then, the industrial control system determines which of the entity models of the first type are associated with the entity models of the second type that are associated with the selected entity model of the first type. Finally, the industrial control system displays an indication of the entity models of the first type that are associated with the entity models of the second type that are associated with the selected entity model of the first type. This system enables the user to easily visualize the entity models 2804 of the first type that are available for association with the entity model of the third type.

Figure 30:
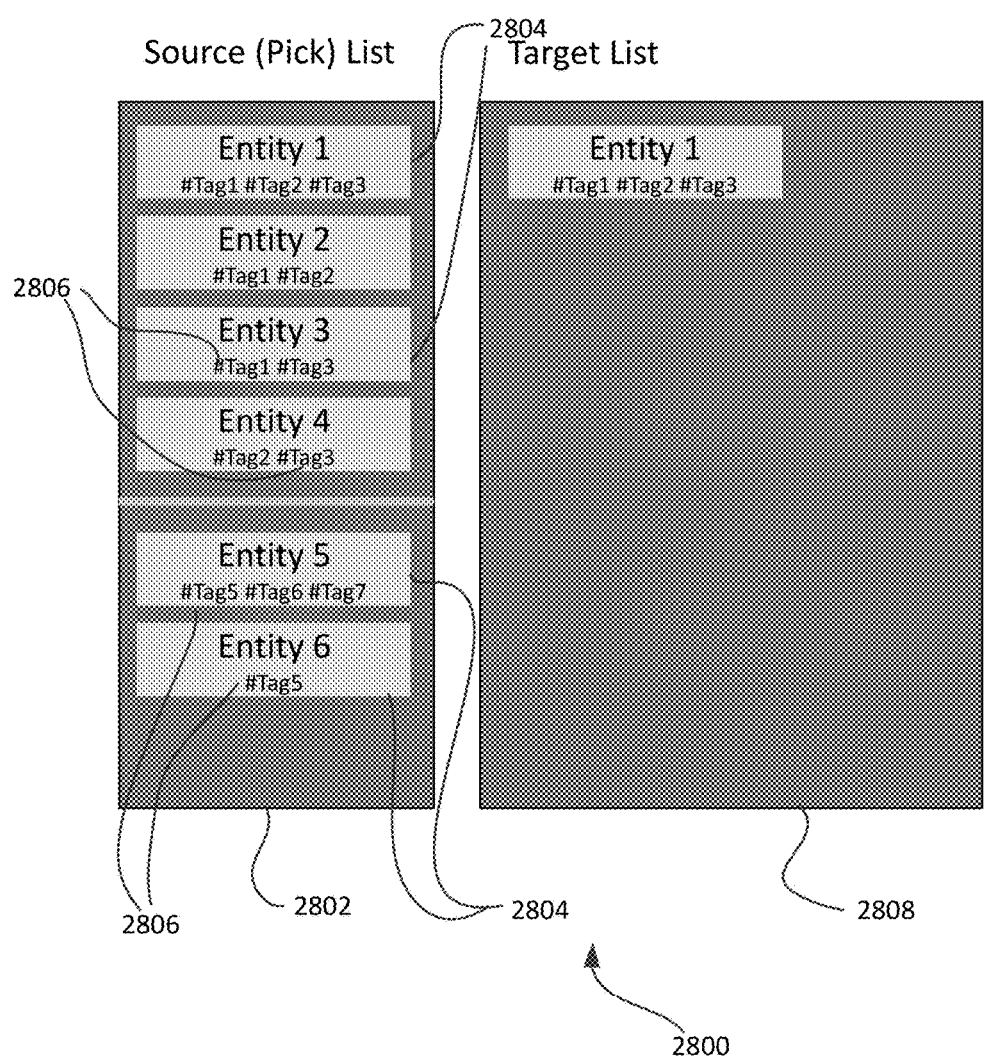
FIG. 30 is another schematically illustrated user interface including the library of entity models of the first type after one of the entity models has been selected.

Referring to FIGS. 29-30, in one example the 'Entity 1' entity model 2804 of the first type is selected for association with a newly created entity model of a third type. When the 'Entity 1' entity model 2804 is selected, it appears in the work area 2808. The industrial control system is configured to determine that the 'Entity 1' entity model 2804 of the first type is associated with three entity models of the second type at tags 2806 '#Tag1,' '#Tag2,' and '#Tag3.' The industrial control system is, next, configured to determine that the 'Entity 1,' 'Entity 2,' 'Entity 3,' and 'Entity 4' entity models 2804 of the first type are also associated with at least one of the entity models of the second type at tags '#Tag1,' '#Tag2,' and '#Tag3' 2806. The industrial control system can also determine that the 'Entity 5' and 'Entity 6' models of the first type are not associated with any of the entity models of the second type at tags '#Tag1,' '#Tag2,' and '#Tag3' 2806. Thus, the industrial control system provides an indication that the 'Entity 1,' 'Entity 2,' 'Entity 3,' and 'Entity 4' entity models 2804 of the first type are available for association with the created entity model of the third type. In the user interface 2900 of FIG. 29, the industrial control system displays only the available entity models 2804 of the first type ('Entity 1,' 'Entity 2,' 'Entity 3,' and 'Entity 4') and does not display the other entity models 2804 of the first type ('Entity 5' and 'Entity 6'). In the user interface 3000 of FIG. 30, the industrial control system displays the available entity models 2804 of the first type ('Entity 1,' 'Entity 2,' 'Entity 3,' and 'Entity 4') in one section of the source list 2802 and displays the other entity models 2804 of the first type ('Entity 5' and 'Entity 6') in another section of the source list 2802. Still other ways of providing an indication of the available entity models of the first type can also be used without departing from the scope of the invention.

It will be understood that if the industrial control system is the recipe management system 10, the entity models 2804 of the first type can be the capability models 54, the entity models of the second type can be the equipment models 56, and the entity model of the third type can be the recipe model 58.

The Abstract and summary are provided to help the reader quickly ascertain the nature of the technical disclosure. They are submitted with the understanding that they will not be used to interpret or limit the scope or meaning of the claims. The summary is provided to introduce a selection of concepts in simplified form that are further described in the Detailed Description. The summary is not intended to identify key features or essential features of the claimed subject matter, nor is it intended to be used as an aid in determining the claimed subject matter.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

Throughout the specification and claims, terms such as "item," "element," "object," etc. may be used interchangeably to generically describe or identify software or display features unless otherwise indicated.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Having described aspects of the invention in detail, it will be apparent that modifications and variations are possible without departing from the scope of aspects of the invention as defined in the appended claims. It is contemplated that various changes could be made in the above constructions, products, and methods without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

What is claimed is:

1. A recipe management system for running a specified recipe on a compatible piece of equipment in a process plant comprising a plurality of pieces of equipment including the compatible piece of equipment having a plurality of capabilities, the recipe management system comprising:
   a processor; and
   a memory storing software that is executable by the processor, the software being configured to:
      receive configuration inputs and based on the configuration inputs:
         create a capability model for each of the plurality of capabilities;
         create at least one capability parameter for each of the capability models;

create an equipment model for each of the plurality of pieces of equipment including the compatible piece of equipment;

create associations between respective ones of the capability models and each of the equipment models by storing in each equipment model copies of each of the capability parameters for the respective capability models;

in each equipment model, map each capability model having a created association therewith with an input/output (IO) address for the respective piece of equipment;

create a recipe model for each of a plurality of recipes including the specified recipe;

create at least one formula parameter including data representing a control value of the respective recipe for each recipe model; and create associations between respective ones of the capability models and each of the recipe models;

map each formula parameter of the respective recipe model to the copy of the corresponding capability parameter stored in the equipment model of the compatible piece of equipment;

receive a recipe selection execution input selecting the specified recipe for execution and in response to said recipe selection execution input:

determine which of the capability models has a created association with the specified recipe;

determine which of the equipment models has a created association with each of the capability models that are determined to have a created association with the specified recipe; and provide an indication of the equipment models that are determined to have a created association with all of the capability models that are also determined to have a created association with the specified recipe; and receive an equipment selection execution input selecting the indication of the equipment model for the compatible piece of equipment and, based on the equipment selection execution input, execute the recipe on the compatible piece of equipment, wherein executing the recipe includes writing the control value included in each formula parameter to the respective IO address of the compatible piece of equipment based on the mapping between each formula parameter and the copy of the respective corresponding capability parameter and based on the mapping in the respective equipment model between the IO addresses of the compatible piece of equipment and the capability models having created associations with both the recipe model for the specified recipe and the equipment model for the compatible piece of equipment.

2. A recipe management system as set forth in claim 1 wherein, to create the associations between respective models and the equipment models, the software is configured to store in each of the equipment models copies of at least some of the data included in the respective capability models.

3. A recipe management system as set forth in claim 2 wherein each of the copies of the data is stored in a record.

4. A recipe management system as set forth in claim 3 wherein the software is configured to store in each of the records the IO address for the respective capability of the respective piece of equipment.

5. A recipe management system as set forth in claim 1 wherein each of the copies of the capability parameters is stored in a respective record.

6. A recipe management system as set forth in claim 5 wherein the software is configured to store in each of the records the IO address for the respective capability of the respective piece of equipment.

7. A recipe management system as set forth in claim 1 wherein based on the configuration inputs the software is configured to override an aspect of at least one capability parameter in the copy of the at least one capability parameter stored in the equipment model.

* * * * *